(12) United States Patent
Ueta et al.

(10) Patent No.: US 8,312,786 B2
(45) Date of Patent: Nov. 20, 2012

(54) SHIFT-LOCK MECHANISM FOR AUTOMATIC TRANSMISSION SHIFTER

(75) Inventors: Mizuho Ueta, Fuchu-cho (JP); Takumi Kusayama, Fuchu-cho (JP)

(73) Assignee: Delta Kogyo Co., Ltd. (JP)

( * ) Notice: Subject to any disclaimer, the term of this patent is extended or adjusted under 35 U.S.C. 154(b) by 185 days.

(21) Appl. No.: 12/853,331

(22) Filed: Aug. 10, 2010

(65) Prior Publication Data
US 2011/0036193 A1   Feb. 17, 2011

(30) Foreign Application Priority Data

Aug. 11, 2009 (JP) .................................. 2009-186343

(51) Int. Cl.
*C21B 13/04* (2006.01)
(52) U.S. Cl. ..................................................... 74/473.23
(58) Field of Classification Search ............... 74/473.21, 74/473.22, 473.23, 473.27, 473.28, 473.3, 74/473.33; 198/221.2–5; 192/220.2, 220.3, 192/220.4, 220.5
See application file for complete search history.

(56) References Cited

U.S. PATENT DOCUMENTS

| 5,791,197 | A  | * | 8/1998 | Rempinski et al. | ........ | 74/473.18 |
| 2004/0168537 | A1 | | 9/2004 | Koontz | | |
| 2005/0081671 | A1 | * | 4/2005 | Oda et al. | .................... | 74/473.18 |
| 2006/0016287 | A1 | | 1/2006 | Grossman | | |
| 2006/0117893 | A1 | * | 6/2006 | Shimizu et al. | ............. | 74/473.21 |
| 2006/0272441 | A1 | * | 12/2006 | Kamei et al. | ................ | 74/473.21 |
| 2007/0137364 | A1 | * | 6/2007 | Howe et al. | ................. | 74/473.21 |

FOREIGN PATENT DOCUMENTS

JP       2007-230424       9/2007

\* cited by examiner

*Primary Examiner* — Troy Chambers
*Assistant Examiner* — Valentin Craciun
(74) *Attorney, Agent, or Firm* — Gerald E. Hespos; Michael J. Porco

(57) ABSTRACT

A shift-lock mechanism includes a lock member to lock or unlock a transmission range-switching member, a solenoid to be operated in response to operation of a brake on a vehicle, and an engagement arm to be engaged releasably with the solenoid. A plunger of the solenoid is movable between a retracted position outside a movement path of the engagement arm, and an engagement position is stretched across the movement path of the engagement arm. When a selector lever is manually moved into a parking range zone, the plunger is moved forwardly from the retracted position to the engagement position to allow a peripheral wall of the plunger to stop movement of the engagement arm. In response to a braking operation, the plunger is moved backwardly from the engagement position to the retracted position to allow stopping of the movement of the engagement arm to be released.

2 Claims, 17 Drawing Sheets

PRIOR ART
FIG. 18A
PRIOR ART
FIG. 18B
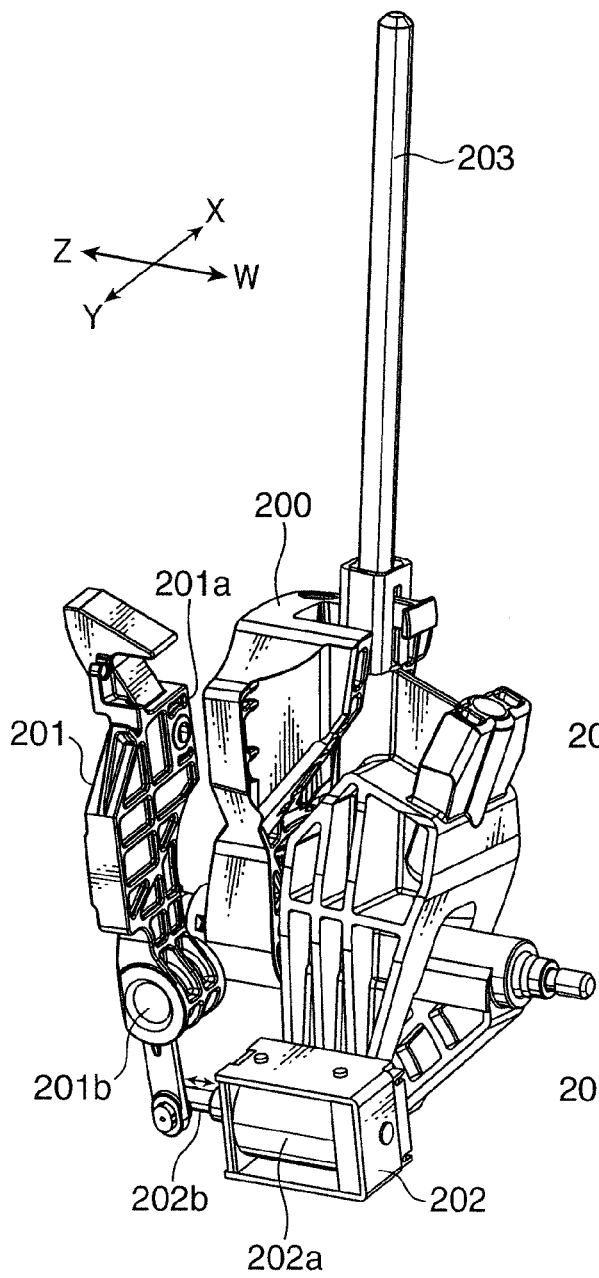
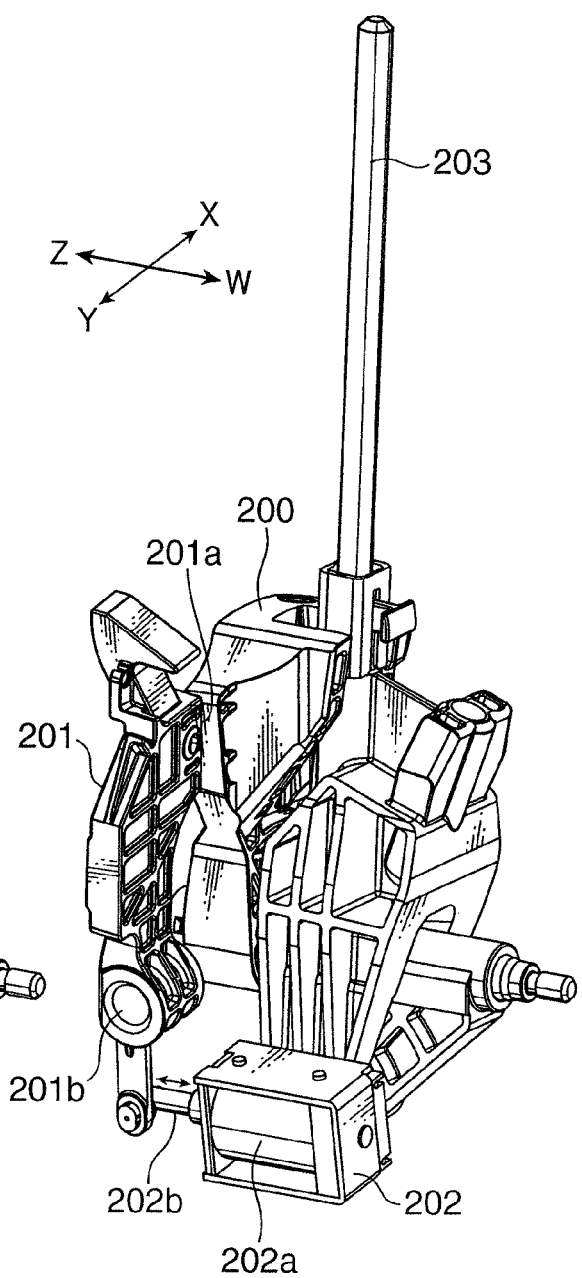

SHIFT-LOCK MECHANISM FOR AUTOMATIC TRANSMISSION SHIFTER

BACKGROUND OF THE INVENTION

1. Field of the Invention

The present invention relates to a shift-lock mechanism for an automatic transmission shifter for use in a vehicle, such as an automobile.

2. Description of the Related Art

Heretofore, an automatic transmission shifter for use in a vehicle such as an automobile has been widely known, and is disclosed, for example, in JP 2007-230424A. An automatic transmission shifter disclosed in this patent document comprises a swingable transmission range-switching member (guide bracket) coupled to an automatic transmission provided on a vehicle, a cable connecting the transmission range-switching member and the automatic transmission each other, and a selector lever (shift lever) detachably coupled to the transmission range-switching member. When the selector lever in a state of being coupled to the transmission range-switching member is moved to a selected one of a plurality of range zones (positions corresponding to respective ones of a plurality of shift ranges, such as a parking range and a drive range) within a gate, the transmission range-switching member is swingably moved along with the movement of the selector lever, and the cable is operated (pulled or pushed) depending on the swing movement, so that the automatic transmission is set to the selected range.

This type of automatic transmission shifter is provided with a shift-lock mechanism for, when once the selector lever is set to a parking range (P range) zone, locking the selector lever so as not to be unexpectedly moved to other range zone.

As an example of the shift-lock mechanism, there has been known one type as shown in FIGS. 18A and 18B. This shift-lock mechanism comprises a lock member 201 adapted to lock or unlock a transmission range-switching member 200 capable of swinging (rotating) in a frontward-rearward direction (X-Y direction in FIGS. 18A and 18B), and a solenoid 202 adapted to be operated in response to an operation of a brake device provided on a vehicle. The solenoid 202 includes a solenoid body 202a, and a plunger 202b adapted to be driven forwardly and backwardly with respect to the solenoid body 202a. The lock member 201 has an upper end formed with a contact portion 201a adapted to come into contact with the transmission-range switching member 200, and a lower end coupled to a distal end of the plunger 202b. Further, the lock member 201 has a pivoted portion 201b which is provided in an intermediate region thereof in an upward-downward direction to allow the lock member 201 to be swingably moved about the pivoted portion 201b so as to cause the contact portion 201a to be swingably moved in a rightward-leftward direction (W-Z direction in FIGS. 18A and 18B).

When a lever shaft 203 of the selector lever is moved into a parking range zone, this fact is detected by detection means (not shown), and the plunger 202b of the solenoid 202 is moved forwardly in response to the detection. Thus, as shown in FIG. 18B, the lock member 201 is swingably moved about the pivoted portion 201b in such a manner that the contact portion 201a is set to a position just rearward of the transmission-range switching member 200. In this state, the lock member 201 interferes with the transmission-range switching member 200 to preclude a possibility of a rearward swing movement thereof, so that the lever shaft 203 of the selector lever coupled to the transmission-range switching member 200 also becomes unable to be swingably moved in the frontward-rearward direction.

In this state, if a brake pedal serving as the brake device is depressed to initiate a braking operation, the plunger 202b is moved backwardly, as shown in FIG. 18A. Thus, the lock member 201 is swingably moved about the pivoted portion 201b in such a manner that the contact portion 201a is moved away from the position just rearward of the transmission-range switching member 200, laterally in the left direction in FIGS. 18A and 18B. Consequently, the transmission-range switching member 200 is placed in a swingably movable state.

However, in the above conventional shift-lock mechanism, the lock member 201 is coupled to the plunger 202b of the solenoid 202, and adapted to be swingably moved in response to the forward/backward movement of the plunger 202b. In this structure, during the forward/backward movement of the plunger 202b, a weight or an inertial load of the lock member 201 is imposed on the plunger 202b. Therefore, the solenoid 202 has to be a type capable of moving the plunger 202b forwardly and backwardly by a force greater than that required for swingably moving the lock member 201. Thus, the conventional shift-lock mechanism has a problem of an increase in size of the solenoid 202, resulting in an increase in overall size of an automatic transmission shifter.

SUMMARY OF THE INVENTION

It is an object of the present invention to provide a shift-lock mechanism for an automatic transmission shifter, capable of reducing a size of a solenoid to facilitate a reduction in overall size of the shifter.

In order to achieve the above object, the present invention provides a shift-lock mechanism comprised in a shifter which is provided with a selector lever and a transmission range-switching member coupled to the selector lever, to switch between a plurality of shift ranges of an automatic transmission based on respective movements of the selector lever and the transmission range-switching member, the shift-lock mechanism comprising: a lock member adapted to lock or unlock the transmission range-switching member; a solenoid adapted to be controllably operated in response to an operation of a brake device provided on a vehicle; and an engagement arm adapted to be releasably engaged with the solenoid, wherein: the engagement arm is interlockably coupled to the lock member in such a manner as to be movable along a given movement path and over a range between a lock position corresponding a locked state in which the transmission range-switching member is locked by the lock member, and an unlock position corresponding an unlocked state in which the lock by the lock member is released; and the solenoid includes a solenoid body, and a plunger adapted to be driven forwardly and backwardly with respect to the solenoid body in such a manner as to be movable over a range between a refracted position where it is retracted outside the movement path of the engagement arm, and an engagement position where it is stretched across the movement path of the engagement arm, and wherein: the solenoid is operable, when the selector lever is manually moved into a parking range zone, to move the plunger forwardly from the retracted position to the engagement position to allow a peripheral wall of the plunger to stop the engagement arm located in the lock position from being moved to the unlock position, and, in response to a braking operation of the brake device, to move the plunger backwardly from the engagement position to the retracted position to allow the stopping of the movement of the engagement arm to be released.

BRIEF DESCRIPTION OF THE DRAWINGS

FIGS. 18A and 18B illustrate one example of a conventional shift-lock mechanism, wherein FIG. 18A is an explanatory diagram showing a state after a transmission range-switching member is unlocked, and FIG. 18B is an explanatory diagram showing a state after a transmission range-switching member is locked.

DETAILED DESCRIPTION OF THE PREFERRED EMBODIMENTS

Figure 1:
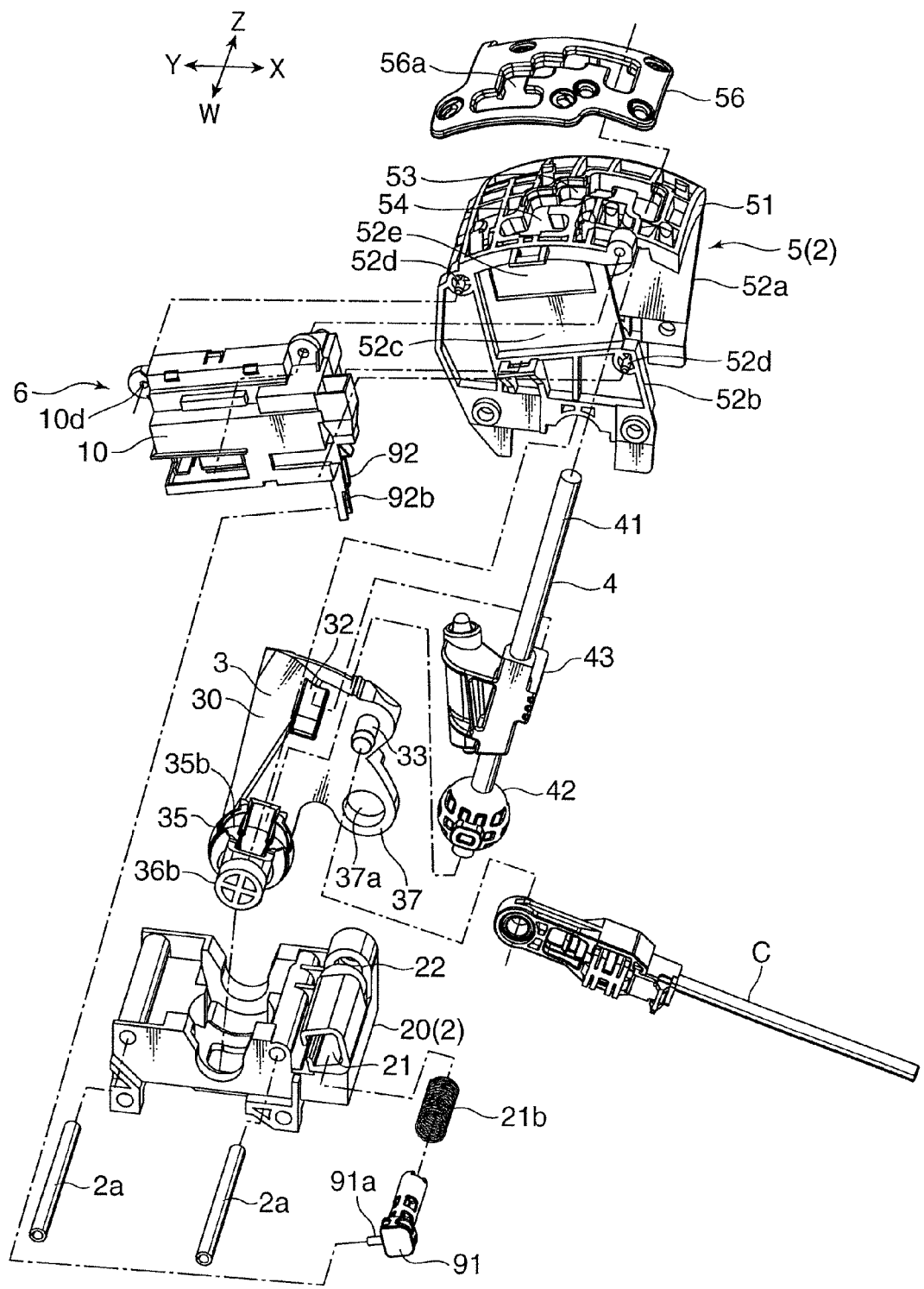
FIG. 1 is an exploded perspective view of an automatic transmission shifter having a shift-lock mechanism according to one embodiment of the present invention.

With reference to the drawings, the present invention will now be specifically described based on a preferred embodiment thereof. FIG. 1 is an exploded perspective view of an automatic transmission shifter having a shift-lock mechanism according to one embodiment of the present invention. In FIG. 1, an X-direction indicates a frontward direction, and a Y-direction indicates a rearward direction. Further, a Z-direction indicates a leftward direction, and a W-direction indicates a rightward direction. This relation also applies to FIGS. 2 to 17.

Figure 2:
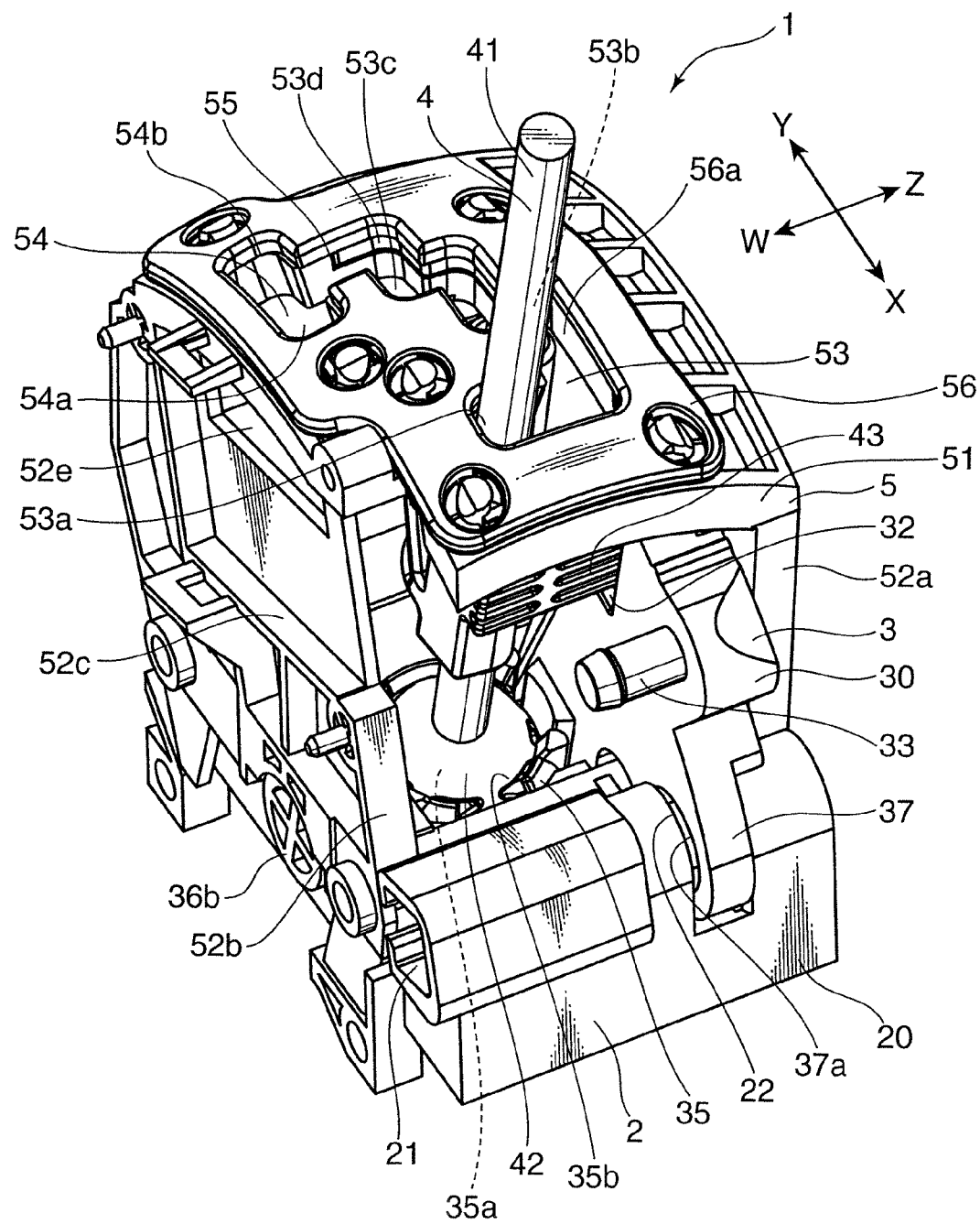
FIG. 2 is a perspective view of the automatic transmission shifter, wherein a shift control unit is omitted.

The automatic transmission shifter 1 according to this embodiment is designed to operate an automatic transmission to be mounted on an automobile. As shown in FIGS. 1 and 2, the shifter 1 comprises a shifter body 2 to be fixed to an automobile body, a transmission range-switching member 3, a selector lever 4, a shift control unit 6, and a shift-lock mechanism.

The shifter body 2 comprises a base 20 and a gate member 5. The base 20 has a front portion which is provided with a lock shaft-housing hole 21 for movably housing an after-mentioned lock shaft 91 of the shift-lock mechanism, and a switching member-receiving groove 22 formed to extend across a part of the lock shaft-housing hole 21. Details of the gate member 5 will be described later.

Figure 3:
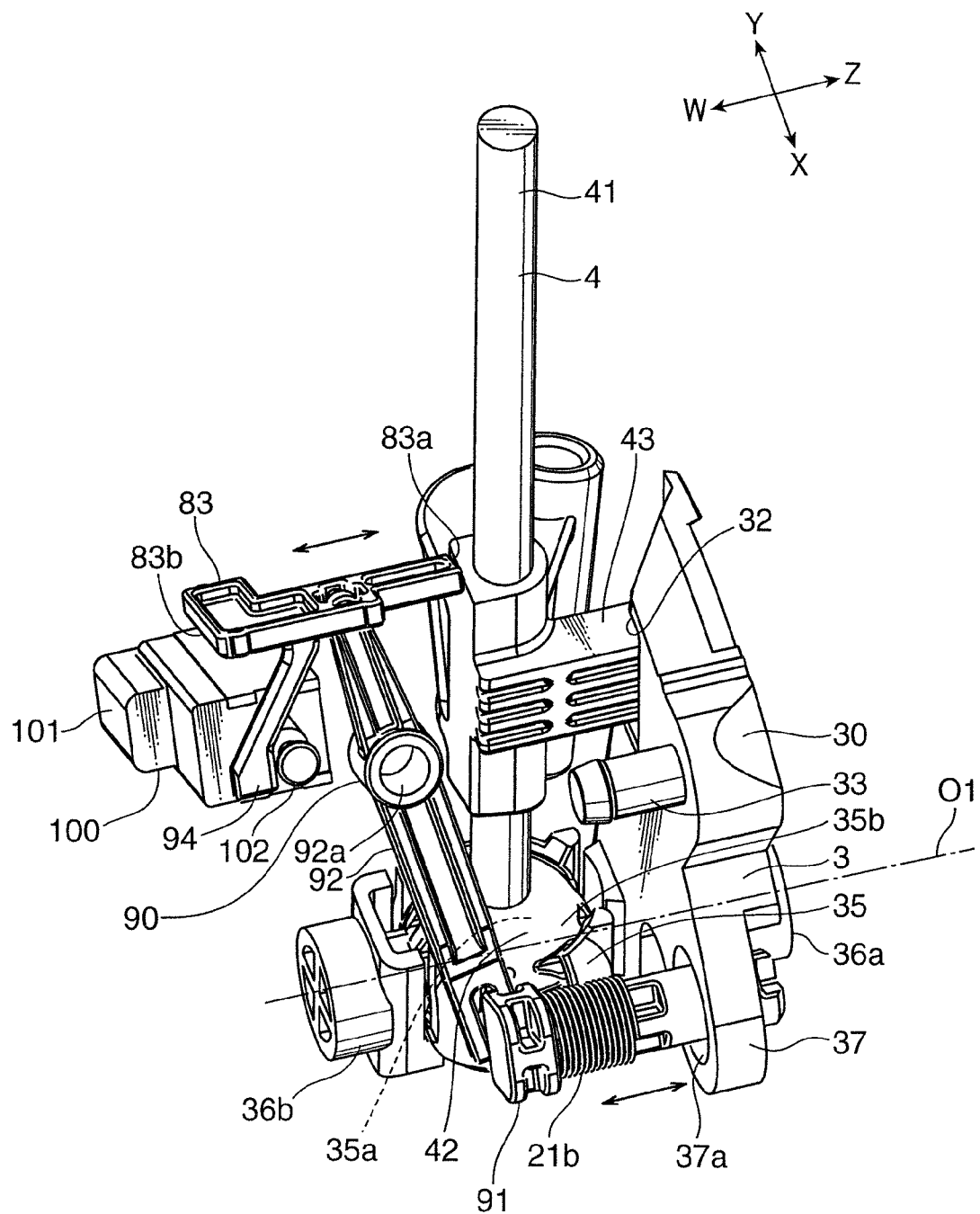
FIG. 3 is a perspective view showing a positional relationship between respective ones of a lock member, a selector lever and a transmission range-switching member, in a shift-lock established state.

As shown in FIGS. 1 and 3, the transmission range-switching member 3 comprises a plate-shaped switching member body 30, a lever-holding portion 35 which holds the selector lever 4, and first and second shaft portions 36a, 36b for mounting the transmission range-switching member 3 to the shifter body 2.

The switching member body 30 has a cable-coupling portion 33 provided on an upper and front region thereof and coupled to one end of a cable C (illustrated in FIG. 1). The other end of the cable C is coupled to an automatic transmission (not shown) provided on a vehicle, so that the transmission range-switching member 3 is coupled to the automatic transmission via the cable C.

The switching member body 30 has a quadrangular-shaped coupling hole 32 provided in an approximately central region of an upper portion thereof in the frontward-rearward direction to penetrate therethrough in the rightward-leftward direction (W-Z direction).

Further, the switching member body 30 has a lock portion 37 provided in a front region of a lower portion thereof with a lock hole 37a. The lock portion 37 is capable of being inserted into and pulled out of the switching member-receiving groove 22 of the shifter body 2.

In this embodiment, the lever-holding portion 35 is integrally formed with the switching member body 30, to protrude from the switching member body 30 in the rightward direction (W-direction in FIG. 3).

Figure 15:
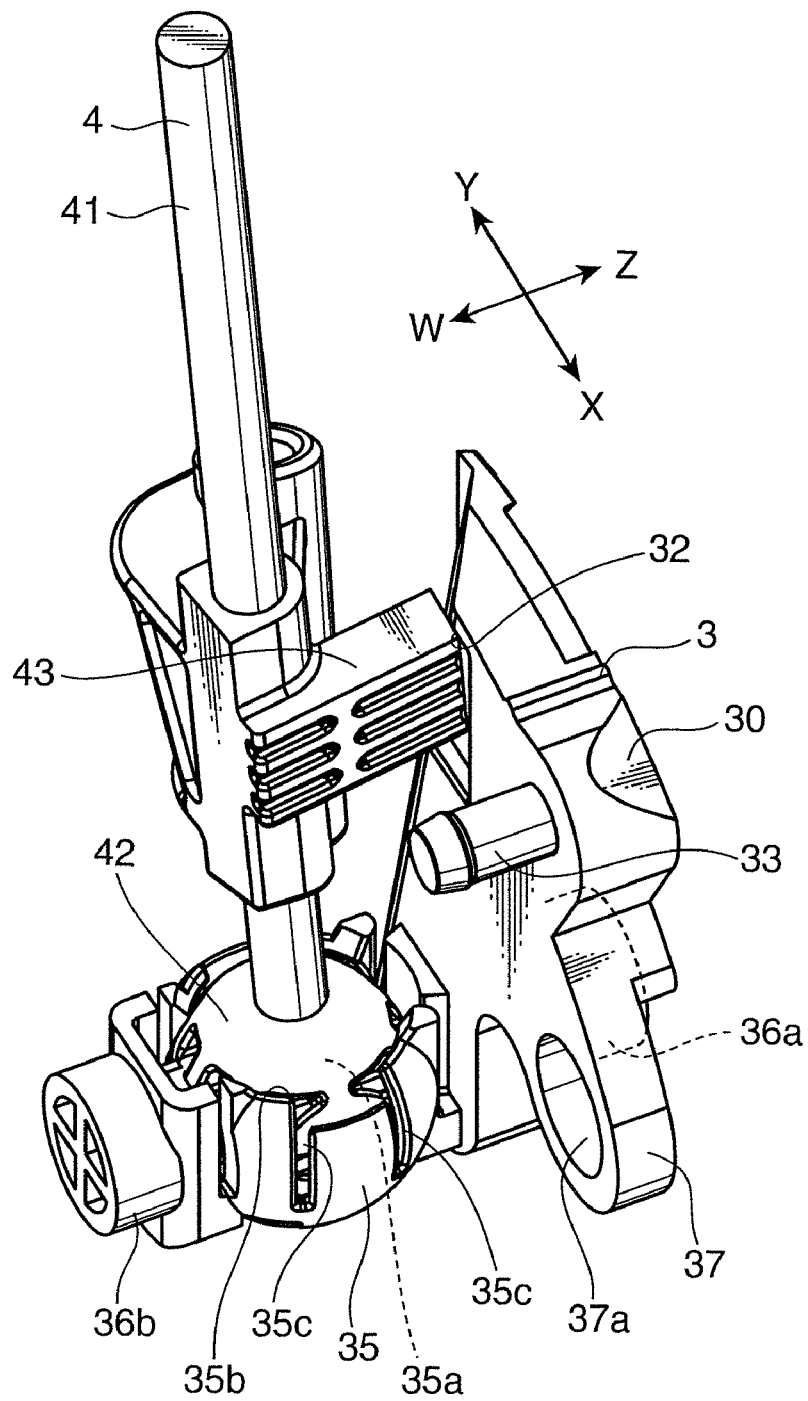
FIG. 15 is a perspective view showing a state after a coupling between a switching member body and the selector lever is released.

As shown in FIGS. 2 and 15, the lever-holding portion 35 has an approximately spherical-shaped spherical receiving portion 35b with an opening 35a opened upwardly. Further, the lever-holding portion 35 has a plurality of slits 35c, so that an upper region of the lever-holding portion 35 is divided into a plurality of resilient pieces by the slits 35c.

The spherical receiving portion 35b is formed to receive therein an after-mentioned spherical portion 42 of the selector lever 4. Specifically, the spherical receiving portion 35b is adapted to receive therein the spherical portion 42 while being resiliently deformed to enlarge the opening 35a, and, after receiving therein the spherical portion 42, to return to its original state to rollably hold the spherical portion 42.

As shown in FIGS. 3 and 15, the first shaft portion 36a is integrally formed with a lower end portion of the switching member body 30 to protrude from the switching member body 30 in the leftward direction (Z-direction in FIGS. 3 and 15). The second shaft portion 36b is provided to protrude from the lever-holding portion 35 in the rightward direction (W-direction in FIGS. 3 and 15).

The first shaft portion 36a and the second shaft portion 36b have the same central axis O1. The central axis O1 of the first and second shaft portions 36a, 36b passes through a center of the spherical receiving portion 35b.

Each of the first shaft portion 36a and the second shaft portion 36b is rotatably supported by the shifter body 2. This allows the upper portion of the switching member body 30 to be swingably moved about the center axis O1 in the frontward-rearward direction (X-Y direction).

As shown in FIGS. 1 to 3 and 15, the selector lever 4 comprises a lever shaft 41, a spherical portion 42 provided at a lower end of the lever shaft 41, and a coupling piece 43 provided in an intermediate region of the lever shaft 41 in the upward-downward direction.

The lever shaft 41 is comprised of an axially-elongate circular columnar body, and a manual grip member (not shown) is attached to a top end portion (upper end portion) thereof. The manual grip member is gripped by a driver during a shifting operation.

The spherical portion 42 is comprised of a spherical body having a size capable of being inserted into the spherical receiving portion 35b of the lever-holding portion 35, and rollably held by the spherical receiving portion 35b.

Specifically, when the spherical portion 42 is inserted into the spherical receiving portion 35b, the spherical portion 42 is held in a rollable manner about a center thereof under a condition that the center of the spherical portion 42 coincides with the center of the spherical receiving portion 35b. This allows the top end portion of the lever shaft 41 of the selector lever 4 to be swingably moved with respect to the switching member body 30 in the frontward-rearward direction (X-Y direction), the rightward-leftward direction (W-Z direction), etc.

The coupling piece 43 is formed in a cross-sectionally quadrangular shape capable of being inserted into the coupling hole 32 of the switching member body 30, to protrude from the lever shaft 41 toward the switching member body 30 by a given length.

The coupling piece 43 formed in the above shape is adapted to be inserted into and pulled out of the coupling hole 32 of the switching member body 30 according to a swing movement of the lever shaft 41 in the rightward-leftward direction. Specifically, when the lever shaft 41 is swingably moved in the rightward-leftward direction (W-Z direction) about the center of the spherical portion 42 inserted in the spherical receiving portion 35b of the lever-holding portion 35, the coupling piece 43 is inserted into or pulled out of the coupling hole 32.

When the coupling piece 43 is inserted into the coupling hole 32 of the switching member body 30, a state is established in which the switching member body 30 can be moved together with the lever shaft 41 of the selector lever 4 in the frontward-rearward direction. In other words, when the lever shaft 41 is swingably moved in the frontward-rearward direction, the switching member body 30 is also swingably moved in the frontward-rearward direction along with the swing movement of the lever shaft 41.

When the lever shaft 41 of the selector lever 4 is moved to an after-mentioned parking range (P range) zone 53a provided in the gate member 5 of the shifter body 2, the switching member body 30 is placed in a state where it is swingably moved to a frontwardmost position. In this state, the lock portion 37 of the switching member body 30 is inserted in the switching member-receiving groove 22 of the shifter body 2, in such a manner that the lock hole 37a of the lock portion 37 and the lock shaft-housing hole 21 of the shifter body 2 are aligned with each other, as shown in FIG. 2.

As shown in FIGS. 1 and 2, the gate member 5 of the shifter body 2 comprises a gate plate 51 and a pair of left and right sidewalls 52a, 52b. In this embodiment, the gate plate 51 has a main gate 53 for guiding the lever shaft 41 in an automatic mode, and a sub-gate 54 for guiding the lever shaft 41 in a manual mode.

The main gate 53 has a parking range (P range) zone 53a, a reverse range (R range) zone 53b communicated with the parking range zone 53a, a neutral range (N range) zone 53c communicated with the reverse range zone 53b, and a drive range (D range) zone 53d communicated with the neutral range zone 53c.

The sub-gate 54 is communicated with the drive range zone 53d of the main gate 53 through a communication passage 55. The sub-gate 54 has a minus-gate zone 54a and a plus-gate zone 54b. In this embodiment, the minus-gate zone 54a and the plus-gate zone 54b are arranged, respectively, on a front side and a rear side with respect to the communication passage 55, as shown in FIG. 2. Alternatively, the minus-gate zone 54a and the plus-gate zone 54b are arranged, respectively, on the rear side and the front side with respect to the communication passage 55.

An auxiliary plate 56 is attached along and just above the gate plate 51. The auxiliary plate 56 is designed to suppress hitting sound or the like which would otherwise occur when the lever shaft 41 is moved along the main gate 53 and the sub-gate 54, and made of a material which is softer than the gate plate 51 and less likely to generate hitting sound during hitting of the lever shaft 41. In this embodiment, the auxiliary plate 56 is made of a urethane-based elastomer.

The auxiliary plate 56 has a sound-absorbing gate 56a corresponding to the main gate 53 and the sub-gate 54. Although not illustrated, the sound-absorbing gate 56a is formed to have a width slightly less than that of each of the main gate 53 and the sub-gate 54. Thus, the auxiliary plate 56 is attached in such a manner that an inner peripheral edge of the sound-absorbing gate 56a slightly protrudes from an inner peripheral edge of each of the main gate 53 and the sub-gate 54.

Therefore, when the lever shaft 41 is moved along the main gate 53 and the sub-gate 54, the lever shaft 41 is brought into contact with the inner peripheral edge of the sound-absorbing gate 56a, so that the occurrence of hitting sound is suppressed.

The pair of left and right sidewalls 52a, 52b are provided to extend downwardly, respectively, from left and right ends of the gate plate 51. The left sidewall 52a and the right sidewall 52b will hereinafter be referred to respectively as "left wall 52a" and "right wall 52b". The right wall 52b has a control unit-holding portion 52c provided in an upper region thereof to hold the shift control unit 6.

A lower end of each of the left wall 52a and the right wall 52b is fixed to the base 20 through a fixing shaft 2a, as shown in FIG. 1.

Figure 5:
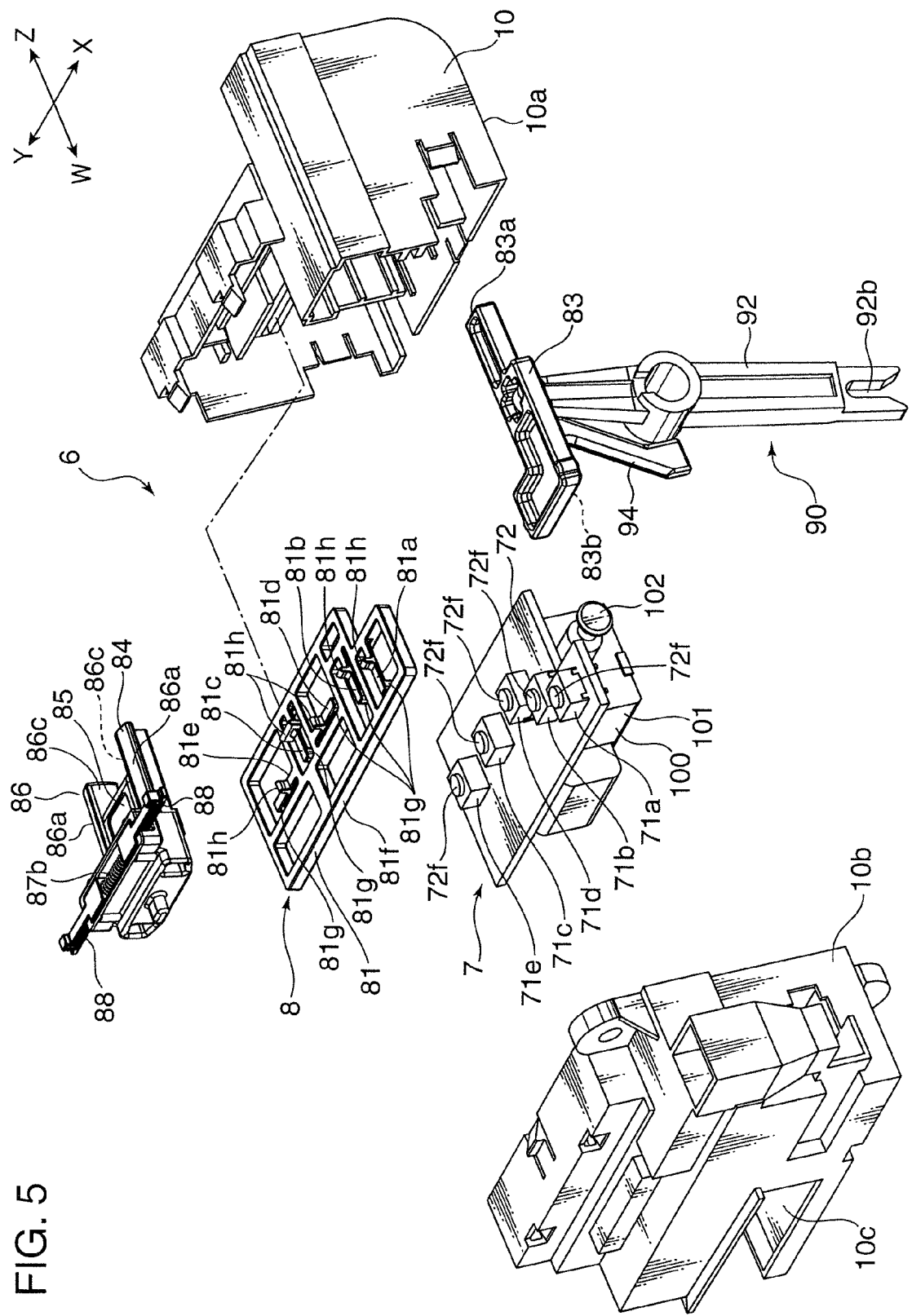
FIG. 5 is an exploded perspective view of a shift control unit.

As shown in FIG. 5, the shift control unit 6 comprises a lever-position detection device 7, a switch control device 8, and a casing 10 which houses these components.

The casing 10 is mounted to the control unit-holding portion 52c of the shifter body 2. In this embodiment, in order to facilitate positioning during an mounting operation for the casing 10, a pin-holding hole 10d is provided in a rear portion of the casing 10 to allow a retainer pin 52d provided on the control unit-holding portion 52c to be inserted thereinto.

The casing 10 is formed by butting a left casing 10a and a right casing 10b with each other in the rightward-leftward direction. A part of the lever-position detection device 7 and the switch control device 8, and a part of an after-mentioned lock member 90, are housed between the left casing 10a and the right casing 10b (i.e., in an internal space of the casing 10). Then, in this state, as shown in FIG. 1, the retainer pin 52d of the control unit-holding portion 52c of the shifter body 2 is inserted into the pin-holding hole 10d, so that the casing 10 is fixedly held by the control unit-holding portion 52c of the shifter body 2.

As shown in FIG. 5, the lever-position detection device 7 comprises a plurality of lever-position detection switches 71a to 71e each serving as a push switch, and a circuit board 72 which holds the lever-position detection switches 71a to 71e.

Each of the lever-position detection switches 71a to 71e has the same structure, and a push button 72f is provided on a top thereof. In this embodiment, the lever-position detection switches 71a to 71e consist of the following five switches: a key-interlock detections switch 71a; a parking detection switch 71b; a communication-passage detection switch 71c; a minus-gate detection switch 71d; and a plus-gate detection switch 71e.

The key-interlock detections switch 71a is designed to detect a fact that the lever shaft 41 of the selector lever 4 is moved into an interlock region pre-set in the parking range zone 53a, and the parking detection switch 71b is designed to detect a fact that the lever shaft 41 is moved into the parking range zone 53a.

The key-interlock detections switch 71a is arranged on a frontward and rightward side with respect to the parking detection switch 71b.

The communication-passage detection switch 71c is designed to detect a fact that the lever shaft 41 is moved into the communication passage 55. The minus-gate detection switch 71d is designed to detect a fact that the lever shaft 41 is moved into the minus-gate zone 54a of the sub-gate 54. The plus-gate detection switch 71e is designed to detect a fact that the lever shaft 41 is moved into the plus-gate zone 54b of the sub-gate 54.

The three switches 71d, 71c, 71e are arranged in a line in the frontward-rearward direction in such a manner that the communication-passage detection switch 71c is located between the remaining two switches. In other words, the minus-gate detection switch 71d, the communication-passage detection switch 71c and the plus-gate detection switch 71e are arranged in side-by-side relation in this order from the frontward side.

The circuit board 72 comprises a circuit (not shown) electrically connected to each of the lever-position detection switches 71a to 71e. The circuit board 72 is housed in the casing 10 while holding the lever-position detection switches 71a to 71e.

The circuit board 72 is communicatably connected to a connector portion 10c attached onto the casing 10. Specifically, the connector portion 10c has a connection terminal (not shown) electrically connected to each of the circuits of the circuit board 72.

A connection terminal extending from a main control unit (not shown) provided on the vehicle is connected to the connector portion 10c from an outside of the casing 10. In this way, each of the lever-position detection switches 71a to 71e is communicatably connected to the main control unit via the connector portion 10c.

The switch control device 8 comprises a switch-pushing member 81, and first and second pressing members 83, 84. The switch-pushing member 81 includes a plurality of actuating arms 81a to 81e, and a support frame 81f serving as a support member which supports the actuating arms 81a to 81e.

In this embodiment, the actuating arms 81a to 81e consist of the following five arms: a key-interlock detection switch-actuating arm 81a; the parking detection switch-actuating arm 81b; a communication-passage detection switch-actuating arm 81c; a minus-gate detection switch-actuating arm 81d; and a plus-gate detection switch-actuating arm 81e.

The key-interlock detection switch-actuating arm 81a and the parking detection switch-actuating arm 81b are operable to push the key-interlock detections switch 71a and the parking detection switch 71b, respectively.

In the same manner, the communication-passage detection switch-actuating arm 81c, the minus-gate detection switch-actuating arm 81d and the plus-gate detection switch-actuating arm 81e is operable to push the communication-passage detection switch 71c, the minus-gate detection switch 71d and the plus-gate detection switch 71e, respectively.

Each of the actuating arms 81a to 81e has approximately the same structure. Thus, only a structure of the key-interlock detection switch-actuating arm 81a will be primarily described below, and description of the remaining switches will be omitted. The key-interlock detection switch-actuating arm 81a is comprised of an elongate resilient arm made of a synthetic resin.

Figure 11:
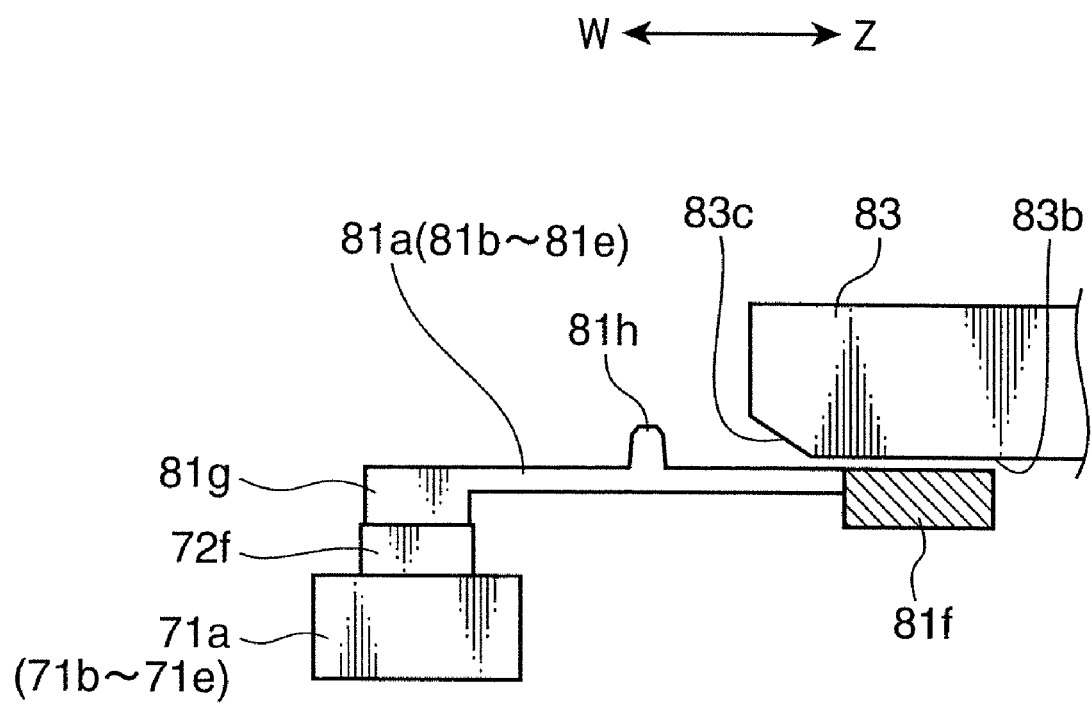
FIG. 11 is a side view showing a positional relationship between the first pressing member and an actuating arm(s) illustrated in FIG. 8, when viewed from the side of lateral surfaces thereof

As shown in FIG. 11, the key-interlock detection switch-actuating arm 81a has a switch-pushing portion 81g provided on a lower surface of a distal end thereof to push the push button 72f of the key-interlock detections switch 71a.

Further, the key-interlock detection switch-actuating arm 81a has a pressure-receiving portion 81h provided in a longitudinally intermediate region thereof and adapted to be pressed by the first pressing member 83.

The pressure-receiving portion 81h is provided at a position away from the switch-pushing portion 81g by a given distance to protrude upwardly from an upper surface of the key-interlock detection switch-actuating arm 81a.

As shown in FIG. 5, the support frame 81f is integrally formed with the actuating arms 81a to 81e. The support frame 81f is fixed while being housed in the casing 10.

As shown in FIG. 11, the switch-pushing portion 81g of each of the actuating arms 81a to 81e is disposed just above a corresponding one of the push buttons 72f of the lever-position detection switches 71a to 71e, in a contact manner or with a slight gap therebetween.

The first pressing member 83 is designed to press the key-interlock detection switch-actuating arm 81a and the parking detection switch-actuating arm 81b.

Figure 8:
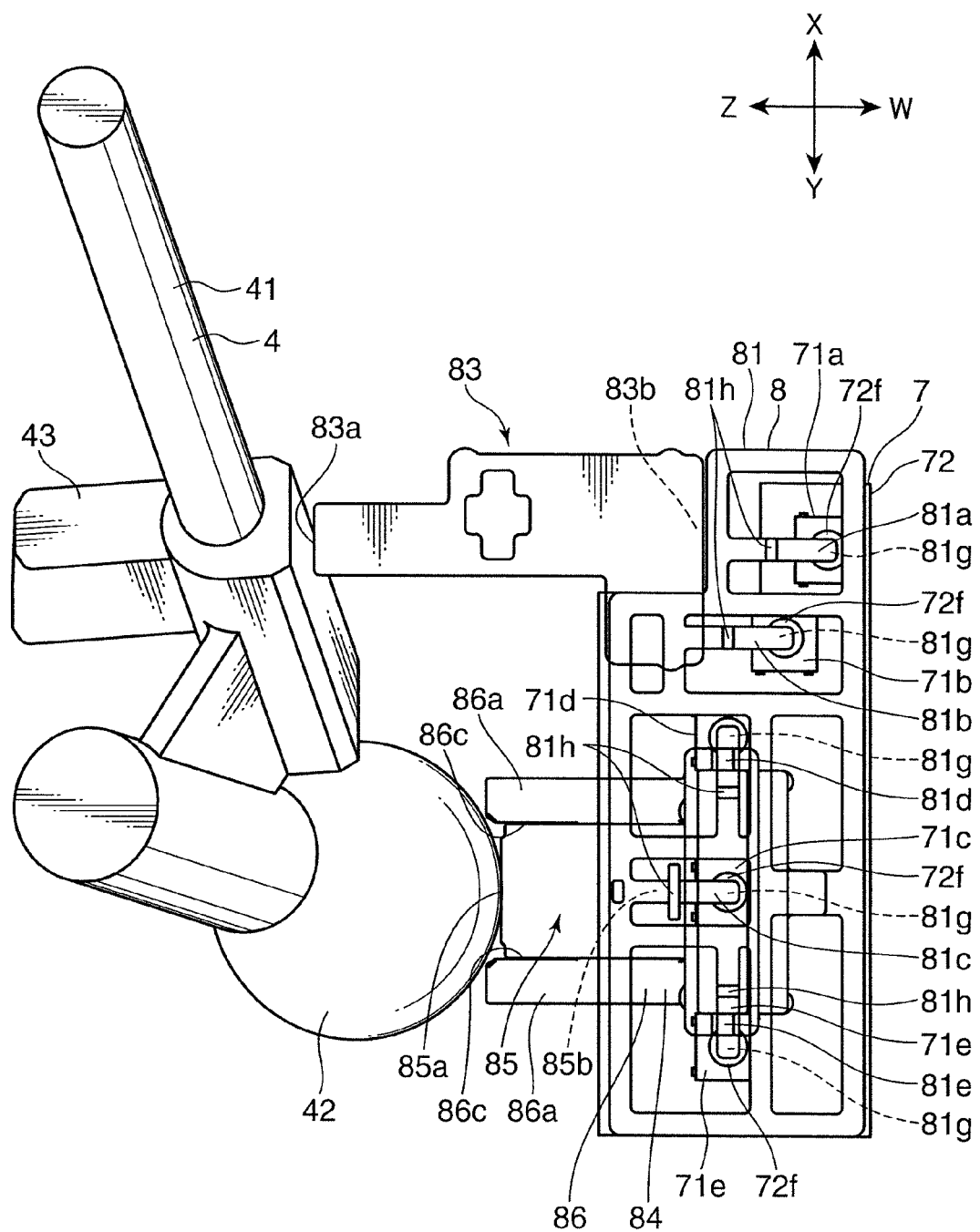
FIG. 8 is a top plan view showing a positional relationship between respective ones of first and second pressing members, a switch-pushing member and a lever-position detection device, under a condition that a lever shaft of the selector lever is located on a left side of a parking range zone.

As shown in FIG. 8, the first pressing member 83 is formed such that a width of a right end portion thereof in the frontward-rearward direction becomes greater than a distance between the respective pressure-receiving portions 81h of the key-interlock detection switch-actuating arm 81a and the parking detection switch-actuating arm 81b in the frontward-rearward direction. Thus, the right end portion of the first pressing member 83 can simultaneously press the two pressure-receiving portions 81h.

Figure 7:
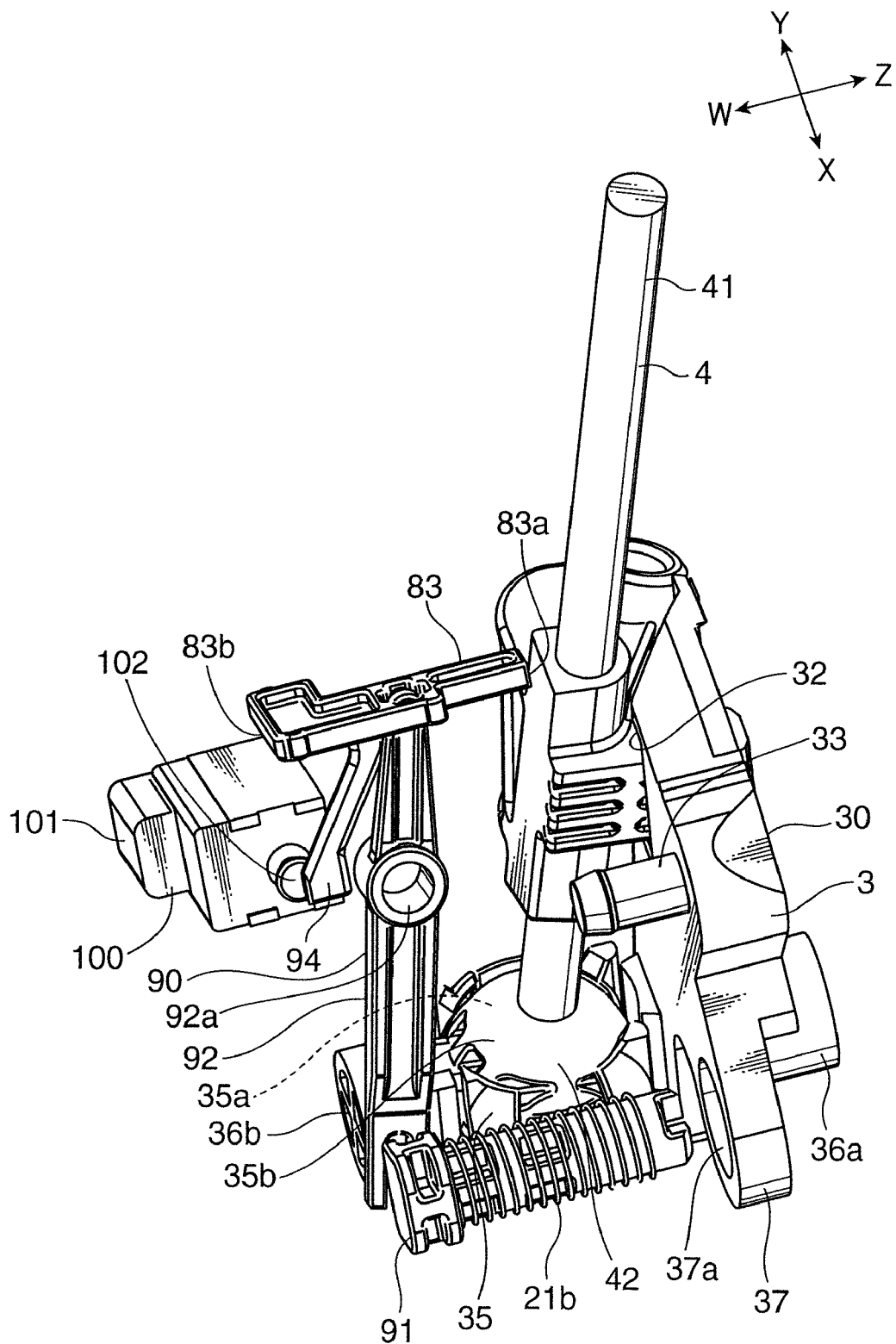
FIG. 7 is a perspective view showing a positional relationship between respective ones of the lock member, the selector lever and the transmission range-switching member, in a shift-lock released state.

The first pressing member 83 has a lever pressure-receiving portion 83a adapted to be pressed by the lever shaft 41 of the selector lever 4, and a pressing portion 83b adapted to press the respective pressure-receiving portions 81h of the actuating arms 81a, 81b, as shown in FIGS. 5, 7 and 8.

In this embodiment, a part of a left end surface (end surface in the Z-direction in FIG. 5) of the first pressing member 83 serves the lever pressure-receiving portion 83a, and a part of a lower surface of the right end portion of the first pressing member 83 serves as the pressing portion 83b. As shown in FIG. 11, the pressing portion 83b has an inclined sub-portion 83c provided in a right end portion thereof to have a height dimension which gradually increases in the rightward direction.

Figure 12:
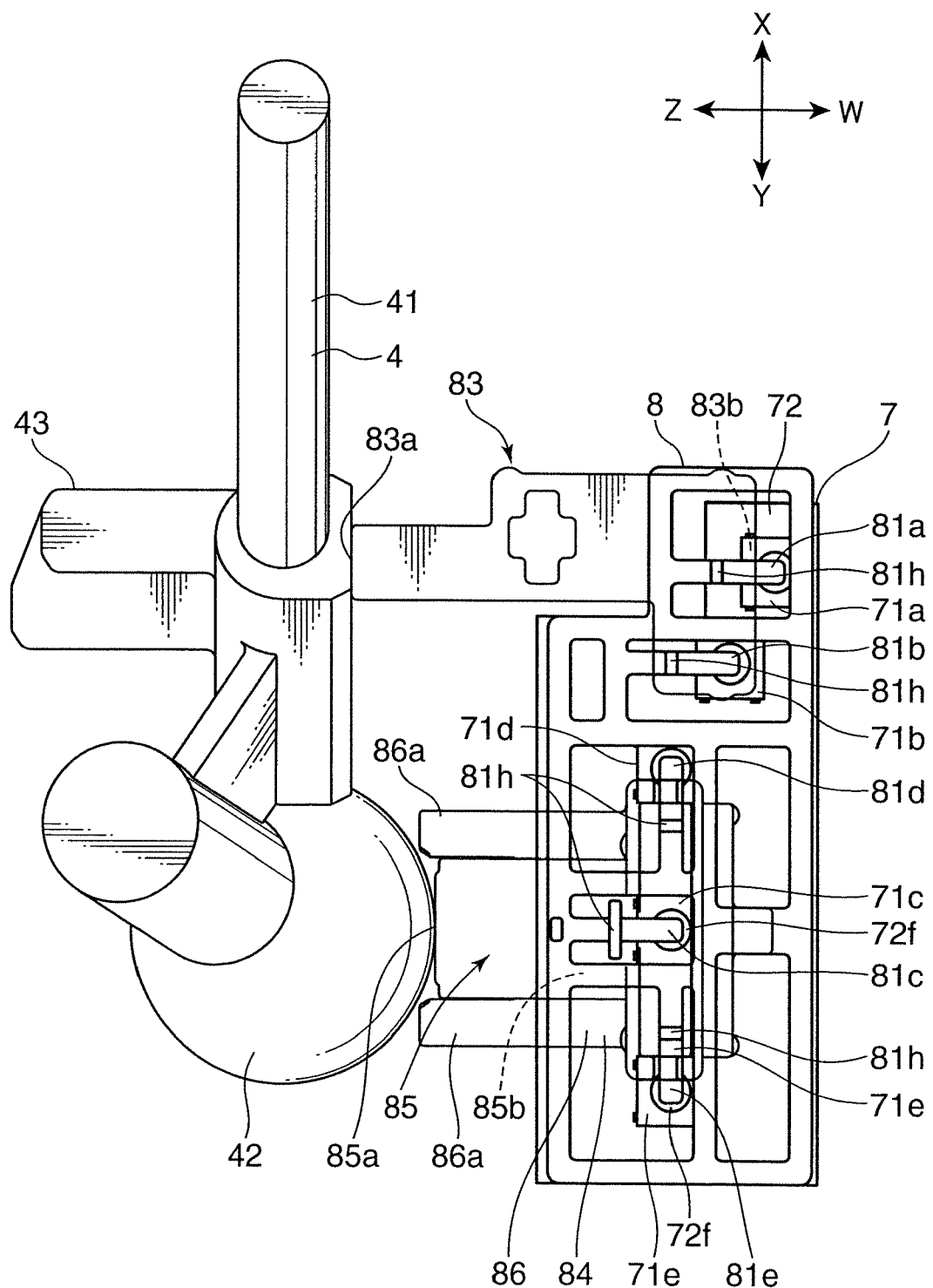
FIG. 12 is a top plan view showing a positional relationship between respective ones of the first and second pressing members, the switch-pushing member and the lever-position detection device, in a state when the lever shaft of the selector lever is moved into the parking range zone.
Figure 14:
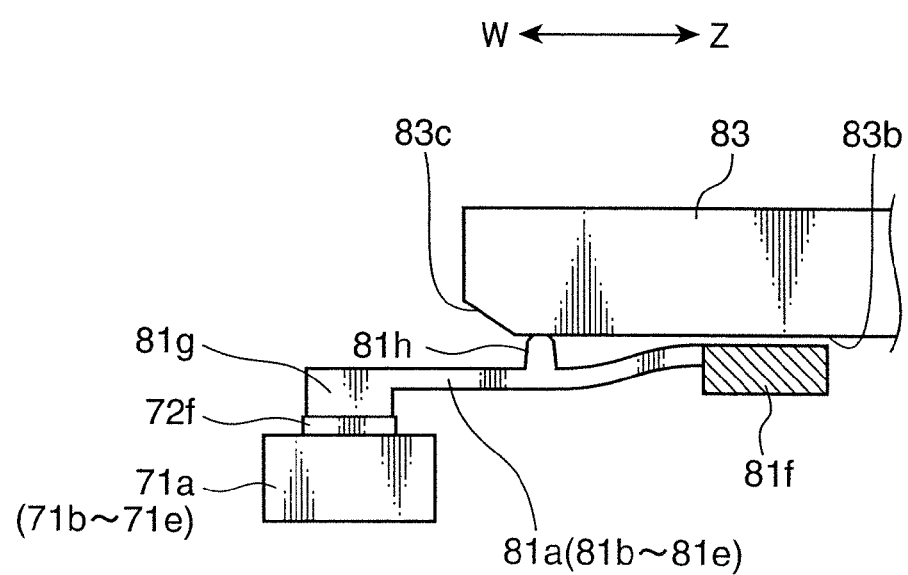
FIG. 14 is a side view showing a state when the first pressing member presses downwardly the pressure-receiving portion of the actuating arm.

The first pressing member 83 formed in the above manner is supported in such a manner that it is movable in the rightward-leftward direction while allowing a right portion thereof to be housed in the casing 10. When the first pressing member 83 is moved, the pressing portion 83b thereof is moved in a range between a position where it is located away leftwardly from each of the pressure-receiving portions 81h of the key-interlock detection switch-actuating arm 81a and the parking detection switch-actuating arm 81b by a given distance, as shown in FIGS. 5 and 8, and a position where it is located just above the pressure-receiving portions 81h, as shown in FIGS. 12 and 14.

Although not illustrated, the lever pressure-receiving portion 83a of the first pressing member 83 is disposed at a position approximately beneath the parking range zone 53a of the gate plate 51, in such a manner as to protrude outwardly from a left end of the casing 10. When the lever shaft 41 is moved into the parking range zone 53a, the lever pressure-receiving portion 83a is pressed by the lever shaft 41, as shown in FIG. 3.

The second pressing member 84 is adapted to press the communication-passage detection switch-actuating arm 81c, the minus-gate detection switch-actuating arm 81d and the plus-gate detection switch-actuating arm 81e.

Figure 6:
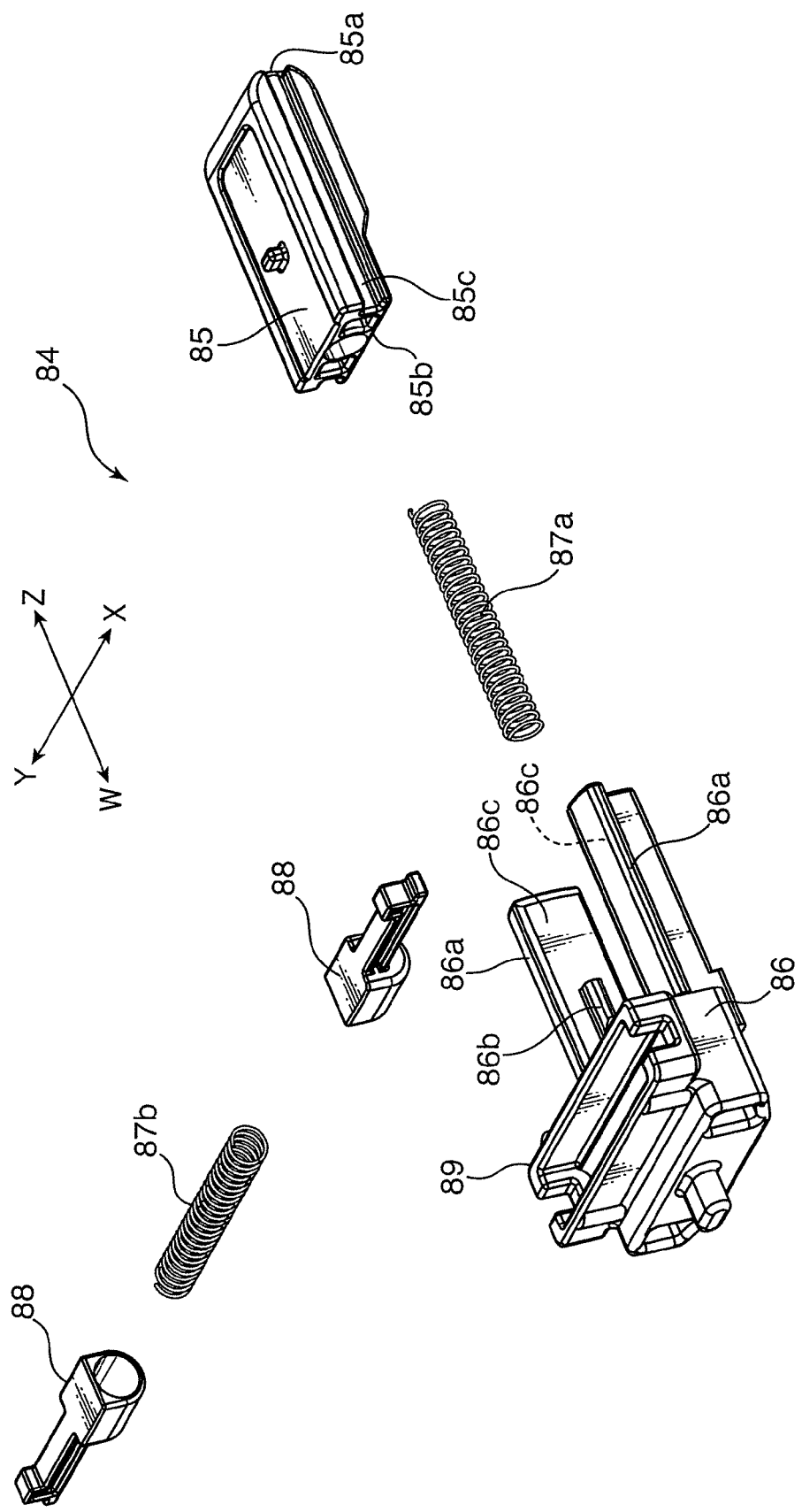
FIG. 6 is an exploded perspective view of a second pressing member.

As shown in FIGS. 5 and 6, the second pressing member 84 comprises a second pressing member body 86, a slidable member 85 held by the second pressing member body 86 in a movable manner in the rightward-leftward direction.

The slidable member 85 has a first lever pressure-receiving portion 85a adapted to be pressed by the lever shaft 41 of the selector lever 4 when the lever shaft 41 is moved into the communication passage 55, and a pressing portion 85b adapted to press the respective pressure-receiving portions 81h of the actuating arms 81c to 81e (see FIG. 5).

Although not illustrated, the pressing portion 85b also has an inclined sub-portion provided in a right end portion thereof to have a height dimension which gradually increases in the rightward direction.

The second pressing member body 86 includes a pair of front and rear elongate-shaped holding pieces 86a for holding the slidable member 85.

The holding pieces 86a have a pair of slide protrusions 86b provided on respective ones of opposed inner surfaces to extend in a longitudinal direction thereof (in FIG. 6, only a rear one of the slide-guide protrusions 86b is illustrated). The slide protrusions 86b are slidably fitted into a pair of slide grooves 85c provided in front and rear side surfaces of the slidable member 85, so that the slidable member 85 is held in a slidably movable manner in the rightward-leftward direction (W-Z direction) with respect to the second pressing member body 86.

The lever shaft 41 of the selector lever 4 can be inserted between the pair of holding pieces 86a holding the slidable member 85. Each of the pair of holding pieces 86a has a second lever pressure-receiving portion 86c provided in a left end portion of a respective one of the opposed inner surfaces and adapted to be pressed by the lever shaft 41 when the lever shaft 41 is moved into the minus-gate zone 54a or the plus-gate zone 54b. The second lever pressure-receiving portion 86c and the first lever pressure-receiving portions 85a make up a lever pressure-receiving portion of the second pressing member 84.

Figure 9:
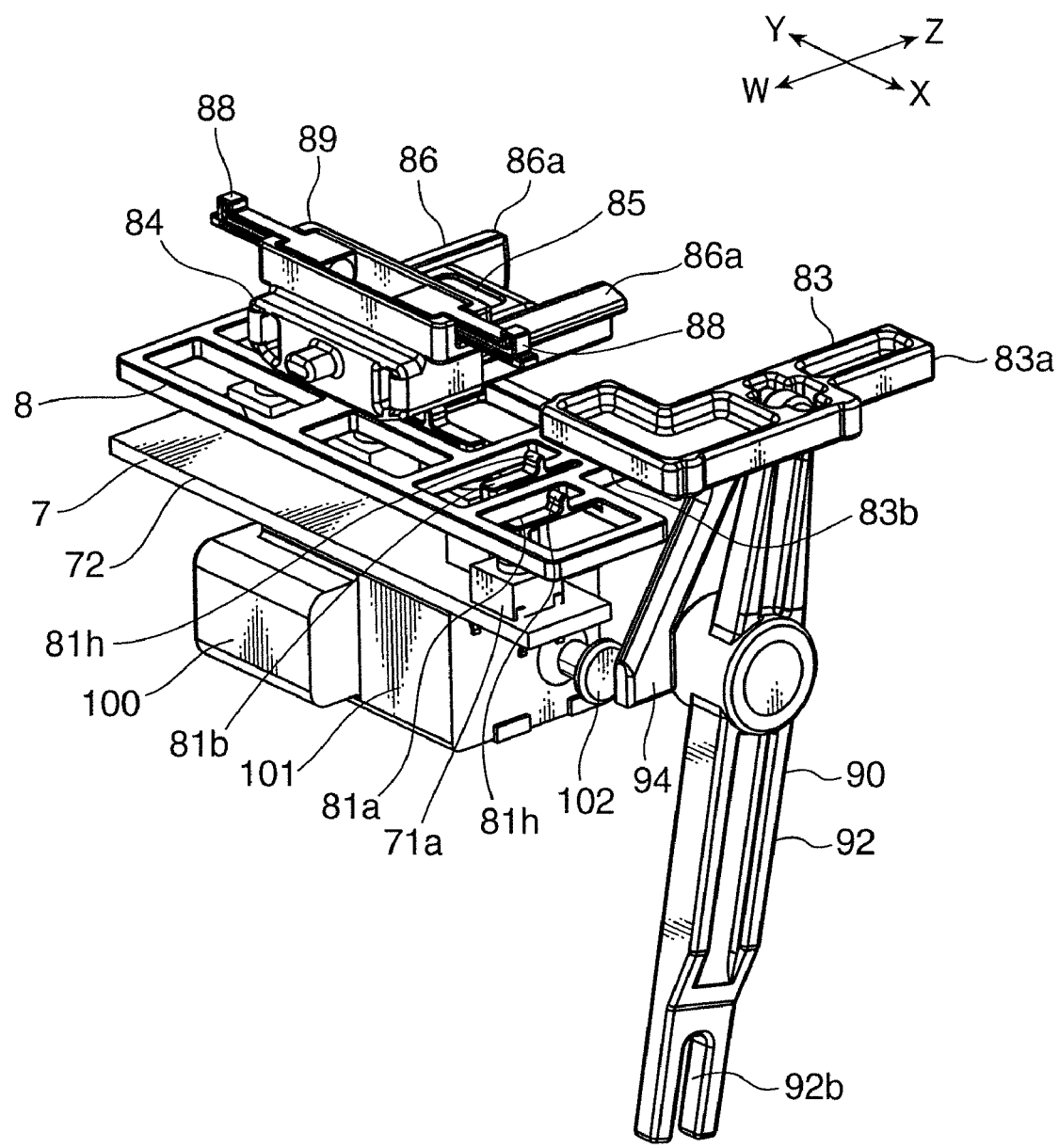
FIG. 9 is a perspective view of the shift control unit, wherein a casing is detached therefrom.

The second pressing member body 86 holding the slidable member 85 in the above manner is housed in the casing 10 at a position just above the pressure-receiving portion 81h of the minus-gate detection switch-actuating arm 81d and the pressure-receiving portion 81h of the plus-gate detection switch-actuating arm 81e, in a movable manner in the frontward-rearward direction, as shown in FIGS. 8 and 9.

Figure 16:
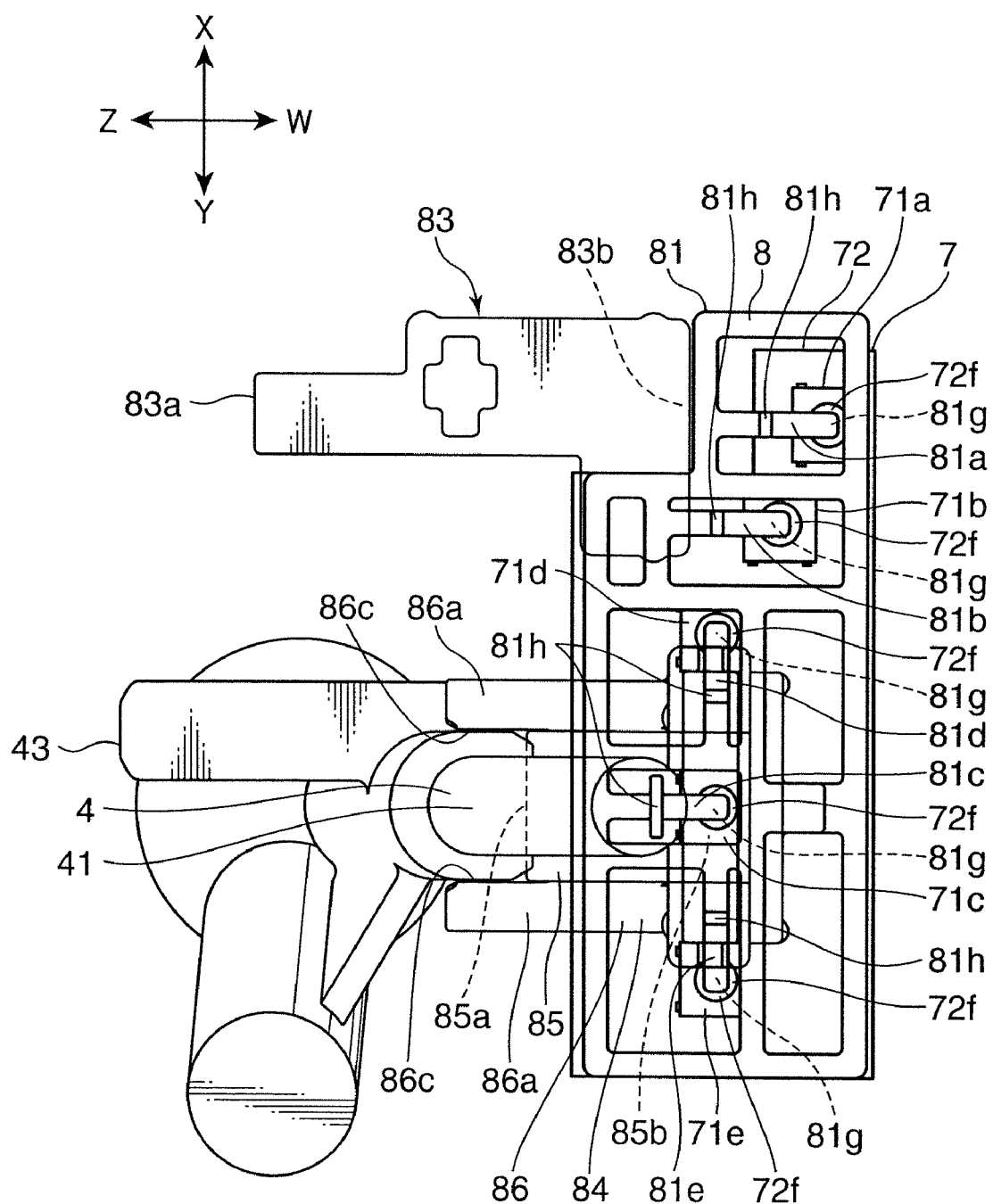
FIG. 16 is a top plan view showing a positional relationship between respective ones of the first and second pressing members, the switch-pushing member and the lever-position detection device, in a state just after the lever shaft of the selector lever is moved to a sub-gate.

In this housed state, the pressing portion 85b of the slidable member 85 is disposed at a position away leftwardly from the pressure-receiving portion 81h of the communication-passage detection switch-actuating arm 81c by a given distance, as shown in FIG. 8. Then, when the slidable member 85 is moved with respect to the second pressing member body 86, as shown in FIG. 16, the pressing portion 85b is moved to a position just above the pressure-receiving portion 81h of the communication-passage detection switch-actuating arm 81c to press this pressure-receiving portion 81h.

Further, the slidable member 85 moved to the position just above pressure-receiving portion 81h is biased leftwardly with respect to the second pressing member body 86 by a first coil spring 87a as first biasing means, as shown in FIG. 6. Thus, if the pressing force of the lever shaft 41 is released, the slidable member 85 is returned to its original position which is a position rightward of the pressure-receiving portion 81h, as shown in FIG. 8.

The second pressing member body 86 is supported while allowing a right end portion thereof to be housed in the casing 10, and moved in the frontward-rearward direction by the lever shaft 41 when it is moved into the minus-gate zone 54a or the plus-gate zone 54b. Along with the movement, the pressing portion 85b of the slidable member 85 is moved in the frontward-rearward direction in a range between a position where it is located just above the pressure-receiving portion 81h of the plus-gate detection switch-actuating arm 81e (see FIG. 17), and a position where it is located just above the pressure-receiving portion 81h of the minus-gate detection switch-actuating arm 81d (not shown).

The second pressing member body 86 which is being pressed by the lever shaft 41 is biased by the following second biasing means. Thus, when a pressing force from the lever shaft 41 in the frontward-rearward direction is released, the second pressing member body 86 is returned to its original position illustrated in FIG. 16.

The second biasing means is attached onto a top of the second pressing member body 86. Specifically, as shown in FIG. 6, the second biasing means comprises a protruding piece-holding portion 89 fixed to the second pressing member body 86, a pair of front and rear protruding pieces 88 each held by the protruding piece-holding portion 89 in a slidable manner in the frontward-rearward direction, and a second coil spring 87b disposed between the protruding pieces 88.

Although not illustrated, each of the protruding pieces 88 is disposed within the casing 10 in such a manner that it is brought into contact with an inner wall of the casing 10.

When the second pressing member body 86 is moved frontwardly or rearwardly while being pressed by the lever shaft 41, the protruding pieces 88 in contact with inner wall of the casing 10 are relatively moved frontwardly or rearwardly with respect to the protruding piece-holding portion 89.

Along with the relative movement, the second coil spring 87b is compressed, and thereby the second pressing member body 86 is biased rearwardly or frontwardly.

The holding pieces 86a of the second pressing member body 86 and the first lever pressure-receiving portion 85a of the slidable member 85 are disposed at a position just below the communication passage 55 of the gate plate 51, while protruding outwardly from the left end of the casing 10. Then, when the lever shaft 41 after passing through the communication passage 55 is inserted between the holding pieces 86a, as shown in FIG. 16, the first lever pressure-receiving portion 85a of the slidable member 85 is pressed by this lever shaft 41.

The shift-lock mechanism will be described below. The shift-lock mechanism is designed to, when the lever shaft 41 of the selector lever 4 is set to the parking range zone 53a, lock the lever shaft 41 of the selector lever 4 to prevent the lever shaft 41 from unexpectedly moved to other range zones 53b to 53d.

Figure 4:
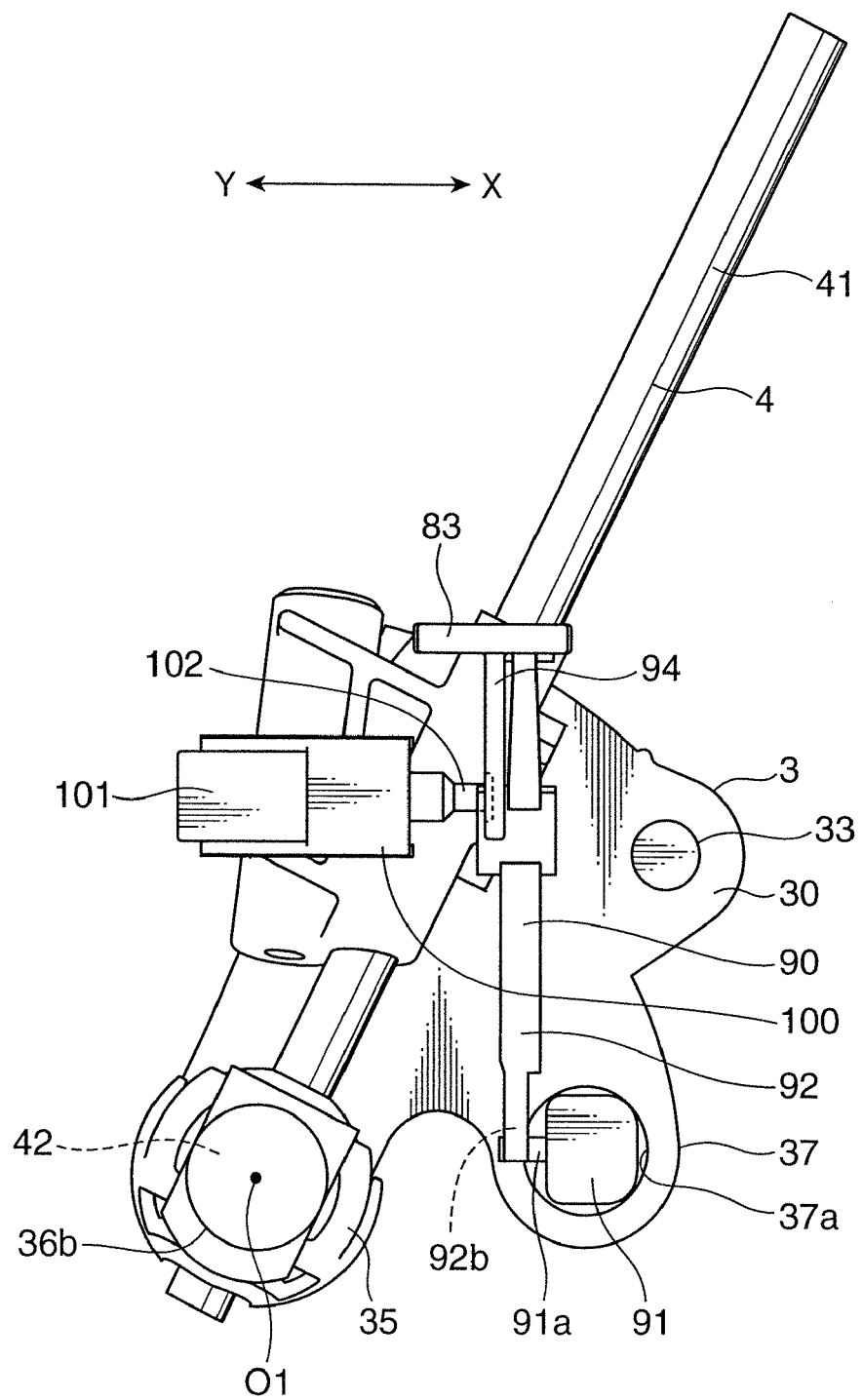
FIG. 4 is a side view of the lock member, the selector lever and the transmission range-switching member illustrated in FIG. 3, when viewed from the side of lateral surfaces thereof.

As shown in FIGS. 3 and 4, the shift-lock mechanism according to this embodiment comprises a lock member 90 adapted to unlockably lock the transmission range-switching member 3, a solenoid 100 operatively connected to a brake pedal as a brake device provided on the vehicle, and an engagement arm 94 adapted to be releasably engaged with the solenoid 100

The lock member 90 comprises a lock shaft 91, and an elongate-shaped lock shaft-actuating member 92 having a lower end portion coupled to the lock shaft 91.

The lock shaft 91 is housed in the lock shaft-housing hole 21 (see FIG. 2) of the shifter body 2 in an axially movable manner with respect to the lock shaft-housing hole 21. As shown in FIG. 3, the lock shaft 91 is adapted, when it is moved toward one side of an axial direction thereof (in the leftward direction), to be inserted into the lock hole 37a of the switching member body 30. Thus, the switching member body 30 is locked under a condition that it is inserted in the switching member-receiving groove 22 (see FIG. 2) of the shifter body 2.

Further, the lock shaft 91 housed in the lock shaft-housing hole 21 is biased toward the other side of the axial direction (in the rightward direction) by a coil spring 21b as a biasing member provided in the lock shaft-housing hole 21. Based on a biasing force of the coil spring 21b, the lock shaft 91 inserted into the lock hole 37a is pressed in a direction causing the lock shaft 91 to be pulled out of the lock hole 37a.

One (upper end portion) of longitudinally opposite end portions of the lock shaft-actuating member 92 is pivotally supported within the casing 10 by the first pressing member 83. When the first pressing member 83 is pressed and moved by the lever shaft 41 of the selector lever 4, the upper end portion of the lock shaft-actuating member 92 is moved in the rightward-leftward direction along with the movement of the first pressing member 83. Thus, in this embodiment, the lock shaft-actuating member 92 is adapted to be indirectly pressed by the lever shaft 41 of the selector lever 4 through the first pressing member 83.

A longitudinally intermediate portion 92a of the lock shaft-actuating member 92 is pivotally supported within the casing 10 by its inner wall. This allows the lock shaft-actuating member 92 to be swingably moved about the intermediate portion 92a in the rightward-leftward direction.

As shown in FIG. 5, a U-shaped engagement groove 92b having an open lower end is provided in a lower end portion of the lock shaft-actuating member 92. As shown in FIG. 1, the lower end portion of the lock shaft-actuating member 92 protrudes outwardly from the lower end of the casing 10. When the casing 10 is mounted to the right wall 52b, an engagement pin 91a (illustrated in FIGS. 1 and 4) provided on the lock shaft 91 is inserted into the engagement groove 92b. Thus, the lock shaft-actuating member 92 is supported in such a manner that the lower end portion thereof is pivotally supported by the lock shaft 91.

The engagement arm 94 is adapted to be movable in the rightward-leftward direction in conjunction with the lock member 90. In other words, the engagement arm 94 is designed such that a movement thereof is permitted in a certain range, or restricted, depending on coupling/uncoupling between the lock member 90 and the switching member body 30.

In this embodiment, as shown in FIGS. 3 and 4, the engagement arm 94 is integrally formed with the first pressing member 83 to extend downwardly. When the lock member 90 is swingably moved, the first pressing member 83 pivotally supported by the upper end portion of the lock member 90 is moved in the rightward-leftward direction, and the engagement arm 94 is also moved together with the first pressing member 83.

The solenoid 100 comprises a solenoid body 101 internally having a coil wire (not shown), and a rod-shaped plunger 102 provided to protrude from the solenoid body 101.

The plunger 102 is adapted to be moved forwardly and backwardly with respect to the solenoid body 101 (to be movable in an axial direction thereof). The plunger 102 in this embodiment is continuously biased in a direction causing the plunger 102 to be moved forwardly (protrude) with respect to the solenoid body 101 (in the X-direction), by a biasing spring (not shown) provided inside the solenoid body 101. Further, the plunger 102 is adapted to be pulled by a magnetic force generated when a current is supplied to the coil wire of the solenoid body 101, and moved backwardly toward the solenoid body 101 (in the Y-direction) against the biasing force of the biasing spring.

Thus, the plunger 102 in this embodiment is adapted to be movable forwardly and backwardly between a longest state (state illustrated in FIG. 4) in which it protrudes from the solenoid body 101 to have the longest protruding length, and a shortest state (state illustrated in FIG. 10) in which it is moved backwardly toward the solenoid body 101 to have the shortest protruding length.

The solenoid 100 is communicatably connected to each of the key-interlock detections switch 71a and the parking detection switch 71b via the main control unit of the vehicle. In other words, the main control unit communicatably connected to the key-interlock detections switch 71a and the parking detection switch 71b is communicatably connected to the solenoid 100.

The solenoid 100 is adapted to be controlled by the main control unit in response to the operation of the brake pedal. More specifically, when the parking detection switch 71b detects a fact that the lever shaft 41 of the selector lever 4 is moved into the parking range zone 53a, and the brake pedal is depressed by a driver, the main control unit is operable to detect these facts and supply a current to the solenoid 100 based on the detection. Then, according to the current supply, the plunger 102 is moved backwardly toward the solenoid body 101.

The solenoid 100 is mounted to allow the solenoid body 101 to be housed in the casing 10. In this state, a central axis of the plunger 102 is oriented in a direction along the frontward-rearward direction and perpendicular to a moving direction of the engagement arm 94.

Figure 10:
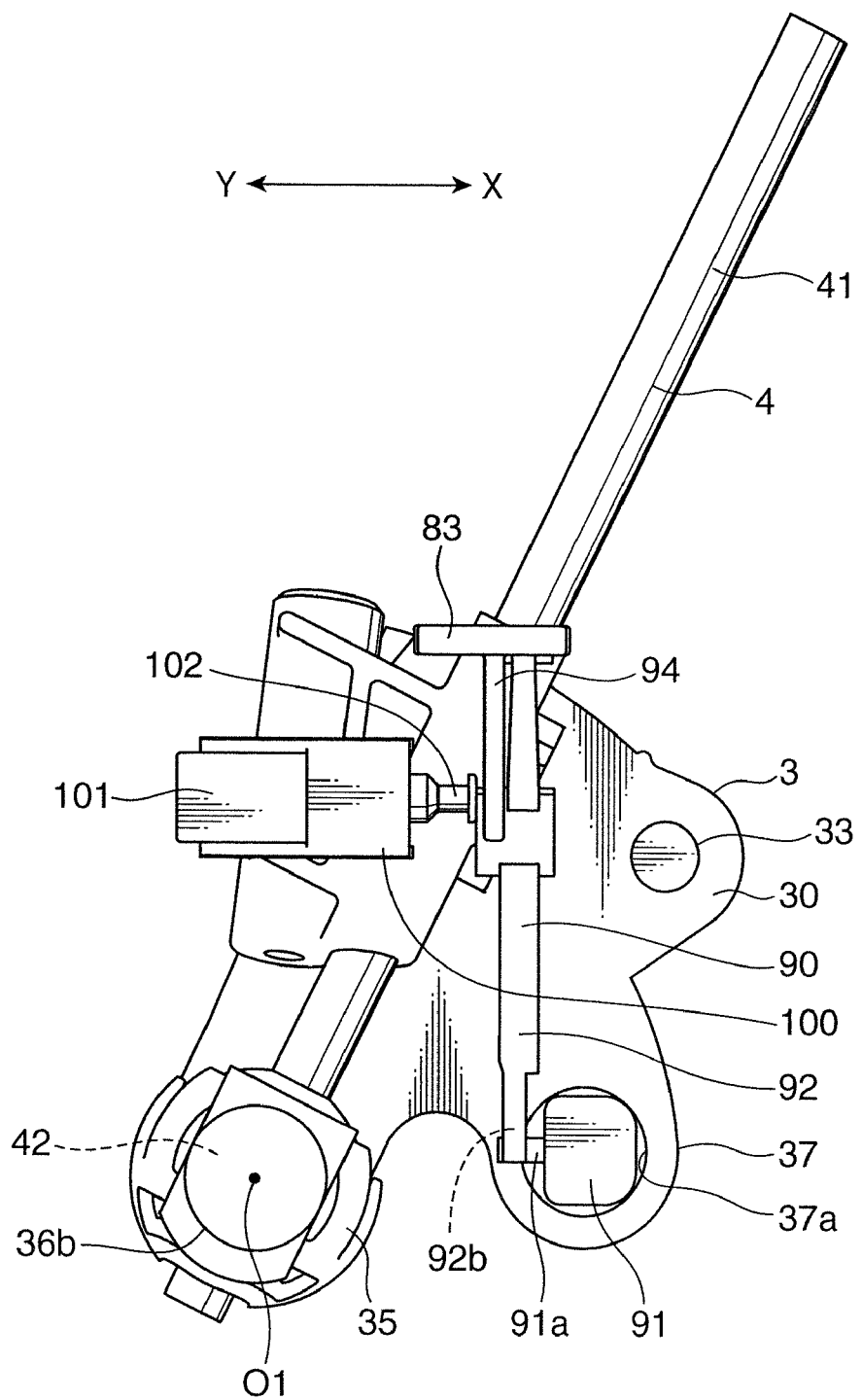
FIG. 10 is a side view showing a positional relationship between respective ones of an engagement arm, the selector lever and the transmission range-switching member, under a condition that a plunger is set to a shortest state.

In the shortest state illustrated in FIG. 10 (the state in which the plunger 102 is moved backwardly toward the solenoid body 101), the plunger 102 is located at a retracted position where it is retracted backwardly away from a movement path of the engagement arm 94. On the other hand, in the longest state where the plunger 102 is moved forwardly, the plunger 102 is located at an engagement position where it is stretched across the movement path (it gets into the path), as shown in FIGS. 3 and 4. In other words, the engagement arm 94 and the plunger 102 partially overlap each other, as indicated by the state in FIG. 4 when viewed from the side of a lateral surface of the engagement arm 94.

An operation of the above shifter 1 will be described below. For convenience of explanation, the following description will start with a state in which the lever shaft 41 of the selector lever is not set to the parking range zone 53a, for example, a state in which the lever shaft 41 is located at a position leftward of the parking range zone 53a.

When the lever shaft 41 of the selector lever is located at a position leftward of the parking range zone 53a, the first pressing member 83 is located away from the lever shaft 41 and leftward of the respective pressure-receiving portions 81h of the key-interlock detection switch-actuating arm 81a and the parking detection switch-actuating arm 81b, as shown in FIGS. 7 and 8.

Further, the engagement arm 94 is located at an unlock position which is a position frontward of the plunger 102 of the solenoid 100, as shown in FIG. 9. In this state, a front end surface of the plunger 102 which is urged to be moved forwardly by a biasing force of the biasing spring is in contact with a rear surface of the engagement arm 94. Further, the lock portion 37 of the switching member body 30 is inserted in the switching member-receiving groove 22 of the shifter body 2, and the lock hole 37a of the lock portion 37 and the lock shaft-housing hole 21 of the shifter body 2 are aligned with each other (see FIG. 2).

When the lever shaft 41 is moved from the above position into the parking range zone 53a, the lever shaft 41 is brought into contact with the lever pressure-receiving portion 83a of the first pressing member 83, as shown in FIG. 3.

Subsequently, when the lever shaft 41 is further moved into the parking range zone 53a, the lever pressure-receiving portion 83a is pressed by the lever shaft 41, and thereby the first pressing member 83 is moved rightwardly (W-direction in FIG. 12). Further, along with the movement of the first pressing member 83, the engagement arm 94 is also moved rightwardly. Consequently, the engagement arm 94 is moved to a lock position which is a position offset rightwardly (in the W-direction) with respect to the plunger 102 of the solenoid 100, as shown in FIG. 3.

Concurrently, the lock shaft-actuating member 92 is swingably moved in a counterclockwise direction in FIG. 3. Then, the lock shaft 91 coupled to the lower end portion of the lock shaft-actuating member 92 is moved leftwardly (Z-direction in FIG. 3) against the biasing force of the coil spring 21b. Therefore, the lock shaft 91 is inserted into the lock hole 37a of the switching member body 30 to place the switching member body 30 in a locked state.

Further, when the engagement arm 94 passes through the plunger 102 of the solenoid 100, the plunger 102 which has been in contact with the engagement arm 94 is pressedly moved by the biasing force of the biasing spring and placed in the longest state as shown in FIG. 4, so that the plunger 102 is set to the engagement position where it is stretched across the movement path of the engagement arm 94.

Figure 13:
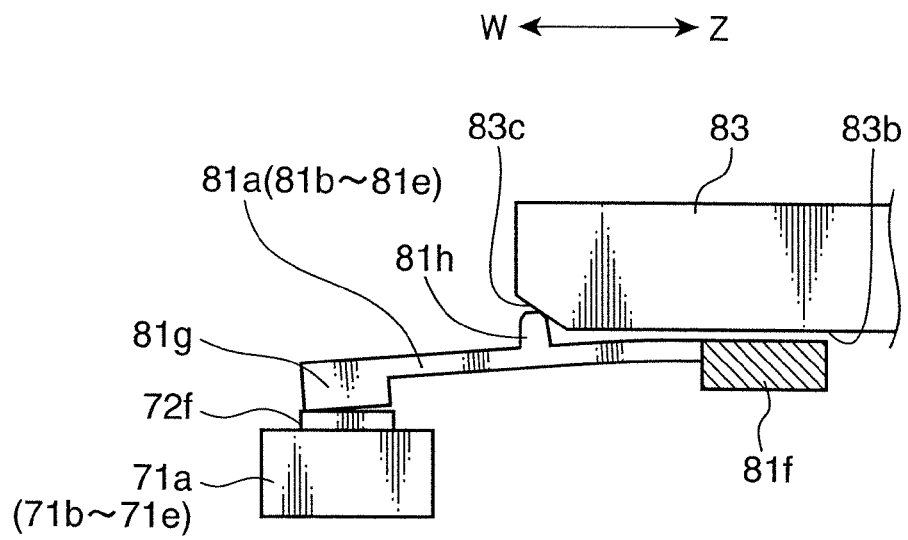
FIG. 13 is a side view showing a state just after the first pressing member is brought into contact with a pressure-receiving portion of the actuating arm.

Along with the movement of the first pressing member 83, the pressing portion 83b of the first pressing member 83 presses the pressure-receiving portion 81h of the parking detection switch-actuating arm 81b, and the pressure-receiving portion 81h of the key-interlock detection switch-actuating arm 81a, as shown in FIG. 13.

According to the pressing, each of the switch-pushing portions 81g of the parking detection switch-actuating arm 81b and the key-interlock detection switch-actuating arm 81a pushes a corresponding one of the push buttons 72f of the parking detection switch 71b and the key-interlock detections switch 71a.

In the above operation, the key-interlock detection switch-actuating arm 81a having resiliency can be bent in the longitudinal direction as shown in FIG. 14. Thus, even if the pressure-receiving portion 81h is pressed by an excessive force, the force is absorbed by the resilient deformation to some extent. This makes it possible to keep an excessive pushing force from acting on the push button 72a so as to prevent an excessive load from being applied to each of the detection switches 71a, 71b. On the other hand, the resiliency allows each of the push buttons 72f to be reliably pushed, so that each of the detection switches 71a, 71b can be reliably actuated.

When the parking detection switch 71b is pushed, information about the fact is transmitted to the main control unit of the vehicle. The main control unit receiving the information will be kept in a standby state until the brake pedal is depressed by a driver, without a current supply to the solenoid 100.

When the key-interlock detections switch 71a is pushed, information about the fact is transmitted to the main control unit. The main control unit receiving the information operates to establish a state for permitting an ignition key to be pulled out of a key insertion hole provided in the vehicle.

In this state, each of the lock shaft 91, the lock shaft-actuating member 92, the engagement arm 94 and the first pressing member 83 is urged to be moved in a direction opposite to the aforementioned direction, by the biasing force of the coil spring 21b.

However, the plunger 102 located in the engagement position is in contact with the engagement arm 94, so that the engagement arm 94 is stopped and kept from being moved, by a peripheral wall of the plunger 102, as shown in FIG. 3, and held in the position illustrated in FIG. 3. Each of the lock shaft 91, the lock shaft-actuating member 92 and the first pressing member 83 is also held in the position illustrated in FIG. 3. Thus, the switching member body 30 is kept in the locked state.

In the locked state, the lever shaft 41 coupled to the switching member body 30 cannot be moved in the frontward-rearward direction. Thus, even if it is erroneously tried to move the lever shaft 41 during parking, the lever shaft 41 is held in the parking range zone 53a to preclude a possibility to move the lever shaft 41 from the parking range zone 53a, for example, to the reverse range zone 53b.

When the lever shaft 41 is set to the parking range zone 53a, the lever shaft 41 of the selector lever 4 is maintained in the parking range zone 53a by latch means (not shown) for releasably latching the selector lever 4 and the gate members 5 together.

If it is necessary to release the locked state so as to drive the automobile, a driver may depress the brake pedal. When the brake pedal is depressed, the main control unit detects the fact and operates to supply a current to the solenoid body 101 via the circuit board 72. Thus, as shown in FIG. 10, the plunger 102 is moved backwardly against the biasing force of the biasing spring (placed in the shortest state) according to a magnetic force generated by the current supply, so that it is set to the refracted position out of the movement path of the engagement arm 94. In other words, the plunger 102 is located in the engagement position (longest state) during a period where no current is supplied to the solenoid body 101, and, in response to the braking operation, moved backwardly to the retracted position.

When the plunger 102 is moved backwardly to the retracted position, the engagement between the engagement arm 94 and the plunger 102 (the state in which the movement of engagement arm 94 is stopped by the peripheral wall of the plunger 102) is released. As a consequence of the release of the engagement (stopping), the engagement arm 94, the lock shaft 91, the lock shaft-actuating member 92 and the first pressing member 83 are moved according to the biasing force of the coil spring 21b.

The engagement arm 94 is moved to a position frontward of the plunger 102 (unlock position) to block the front side of the plunger 102, as shown in FIGS. 7 and 9. In this state, when the depression of the brake-pedal is released, the main control unit detects the fact and operates to stop the current supply to the solenoid 100.

Thus, the plunger 102 of the solenoid 100 is moved forwardly by the biasing force of the biasing spring, and brought into contact with the rear surface of the engagement arm 94, whereafter this state will be maintained.

Further, as a consequence of the movement of the first pressing member 83, the pushing of the parking detection switch 71b by the first pressing member 83 is released.

When the pushing of the parking detection switch 71b is released, and information about the fact is transmitted to the main control unit (or when a transmission of information indicative of the pushing is stopped), the main control unit operates to inhibit the current supply to the solenoid 100, based on the information (or the fact). Thus, even if the brake pedal is subsequently depressed by a driver, a current is never supplied to the solenoid 100.

As above, during the period where the parking detection switch 71b detects the fact that the selector lever 4 is set to the parking range zone 53a (i.e., during a period where the parking detection switch 71b is in its ON state), the main control unit operates to supply a current to the solenoid 100 in response to depression of the brake pedal. On the other hand, during a period where the parking detection switch 71b is in its OFF state, even if the brake pedal is depressed by a driver, the main control unit operates to inhibit the current supply to the solenoid 100.

In the above operation, as the consequence of the movement of the first pressing member 83, the pushing of the key-interlock detections switch 71a is released before the pushing of the parking detection switch 71b is released. Then, when information about the fact is transmitted to the main control unit (or when a transmission of information indicative of the pushing is stopped), the main control unit operates to actuate a key pull-out prevention means (not shown) to lock an ignition key inserted into a key insertion hole so as to keep it from being pulled out of the key insertion hole.

Subsequently, when the lever shaft 41 of the selector lever 4 is manually pushed out of the parking range zone 53a, and moved to one of the reverse range zone 53b, the neutral range zone 53c and the drive range zone 53d, along the main gate 53, the switching member body 30 coupled to the selector lever 4 is swingably moved rearwardly.

Along with the swing movement of the switching member body 30, the cable C (illustrated in FIG. 1) is pulled, and the shift range of the automatic transmission is switched.

Further, when the lever shaft 41 is moved from the drive range zone 53d into the communication passage 55 (see FIG. 2), the lever shaft 41 is brought into contact with the lever pressure-receiving portion 85a of the slidable member 85 of the second pressing member 84 (see FIG. 16).

Then, when the lever shaft 41 is moved into the sub-gate 54 on the right side of the communication passage 55 through the communication passage 55, a right end portion of the slidable member 85 is moved rightwardly beyond the respective pressure-receiving portions 81h of the minus-gate detection switch-actuating arm 81d and the plus-gate detection switch-actuating arm 81e to press the pressure-receiving portion 81h of the communication-passage detection switch-actuating arm 81c, as shown in FIG. 16.

As a consequence of the pressing, the switch-pushing portion 81g of the communication-passage detection switch-actuating arm 81c pushes the push button 72f of the communication-passage detection switch 71c.

During this operation, the communication-passage detection switch-actuating arm 81c having resiliency can be bent in a longitudinal direction thereof, as shown in FIG. 14, to function as with the key-interlock detection switch-actuating arm 81a and the parking detection switch-actuating arm 81b.

Then, the pushed communication-passage detection switch 71c transmits information about the pressing to the main control unit. The main control unit receives the information and operates to switch the automatic mode to the manual mode.

In the state after the lever shaft 41 is moved into to the sub-gate 54, the coupling piece 43 of the selector lever 4 is pulled out of the coupling hole 32 of the switching member body 30, i.e., the coupling between the selector lever 4 and the switching member body 30 is released, as shown in FIG. 15.

Thus, in this coupling-released state, the switching member body 30 is not moved together with the selector lever 4, so that, even if the lever shaft 41 of the selector lever 4 is moved in the sub-gate 54 in the frontward-rearward direction, the automatic transmission is maintained in a drive range.

Figure 17:
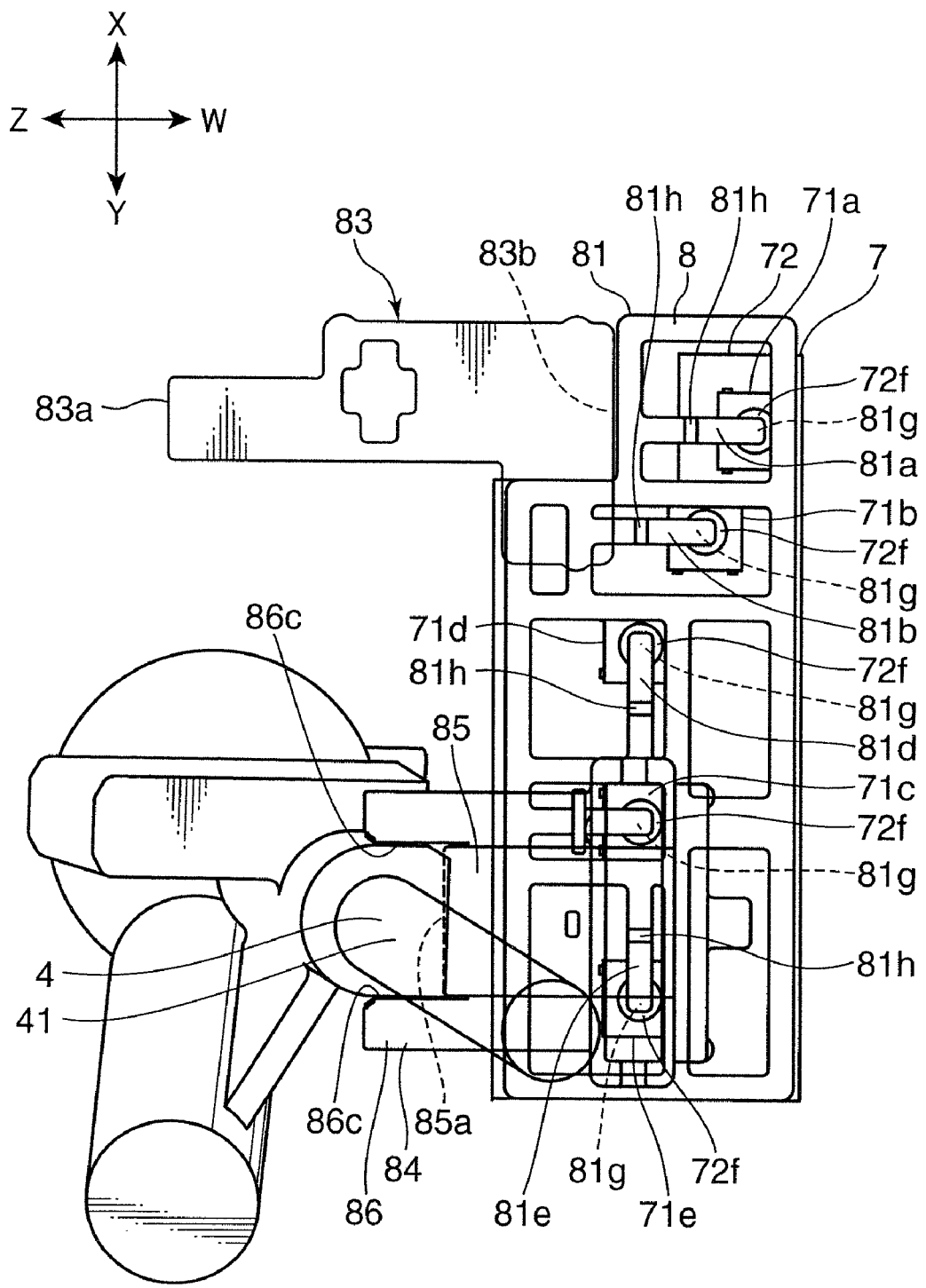
FIG. 17 a top plan view showing a positional relationship between respective ones of the first and second pressing members, the switch-pushing member and the lever-position detection device, in a state just after the lever shaft of the selector lever is moved to a plus-gate zone in the sub-gate.

For example, when the lever shaft 41 in the sub-gate is moved into the plus-gate zone 54b, the second lever pressure-receiving portion 86c of the second pressing member body 86 is pressed rearwardly, as shown in FIG. 17.

Along with the pressing, the second pressing member body 86 and the slidable member 85 held by the second pressing member body 86 are moved rearwardly, and the pressing portion 85b of the slidable member 85 presses the pressure-receiving portion 81h of the plus-gate detection switch-actuating arm 81e.

As a consequence of the pressing, the switch-pushing portion 81g of the plus-gate detection switch-actuating arm 81e pushes the push button 72f of the plus-gate detection switch 71e.

During this operation, the plus-gate detection switch-actuating arm 81e having resiliency can be bent in an longitudinal direction thereof to function as with the key-interlock detection switch-actuating arm 81a and other arms.

The pushed plus-gate detection switch 71e transmits information about the pushing to the main control unit. Based on the information received from the switch 71e, the main control unit operates to shift up a gear stage by one.

If it is necessary to return the lever shaft 41 set to the plus-gate zone 54b to the original position, a driver releases his/her hand from the pushed lever shaft 14. Then, the second pressing member 84 is returned to the original position by the biasing force of the second coil spring 87b (see FIG. 6). Thus, the lever shaft 41 is returned to an intermediate position between the plus-gate zone 54b and the minus-gate zone 54a (the position illustrated in FIG. 16) in the sub-gate 54.

Otherwise, if the lever shaft 41 is moved into the minus-gate zone 54*a*, the second lever pressure-receiving portion 86*c* of the second pressing member body 86 is pressed frontwardly.

Along with the pressing, the second pressing member body 86 and the slidable member 85 held by the second pressing member body 86 are moved frontwardly, and the pressing portion 85*b* of the slidable member 85 presses the pressure-receiving portion 81*h* of the minus-gate detection switch-actuating arm 81*d*.

As a consequence of the pressing, the switch-pushing portion 81*g* of the minus-gate detection switch-actuating arm 81*d* pushes the push button 72*f* of the minus-gate detection switch 71*d*.

The pushed minus-gate detection switch 71*d* transmits information about the pushing to the main control unit. Based on the information received from the switch 71*d*, the main control unit operates to shift down a gear stage by one.

When the driver releases his/her hand from the lever shaft 41 set to the minus-gate zone 54*a*, the second pressing member 84 is returned to the original position by the biasing force of the second coil spring 87*b* (see FIG. 6). Thus, the lever shaft 41 is returned to the intermediate position between the plus-gate zone 54*b* and the minus-gate zone 54*a* (the position illustrated in FIG. 16) in the sub-gate 54.

Subsequently, the lever shaft 41 of the selector lever 4 is returned from the sub-gate 54 to the drive range zone 53*d* through the communication passage 55, the coupling piece 43 of the selector lever 4 is inserted into the coupling hole 32 of the switching member body 30 again, so that the selector lever 4 and the switching member body 30 are placed in the coupled state again.

Then, when the lever shaft 41 of the selector lever 4 is manually moved from the drive range zone 53*d* to the neutral range zone 53*c* in the main gate 53, the switching member body 30 coupled to the selector lever 4 is swingably moved in a direction opposite to the aforementioned direction, i.e., frontwardly.

In the last place, futures and advantages of the above shift-lock mechanism for an automatic transmission shifter will be generally described.

(1) The shift-lock mechanism is provided in a shifter for switching between a plurality of shift ranges of an automatic transmission for a vehicle, and designed to lock a transmission range-switching member when a selector lever of the shifter is set to a parking range. The shift-lock mechanism comprises a lock member adapted to lock or unlock the transmission range-switching member, a solenoid adapted to be controllably operated in response to an operation of a brake device provided on the vehicle, and an engagement arm adapted to be releasably engaged with the solenoid. The engagement arm is operatively connected to the lock member in such a manner as to be movable along a given movement path and over a range between a lock position corresponding a locked state in which the transmission range-switching member is locked by the lock member, and an unlock position corresponding an unlocked state in which the lock by the lock member is released. The solenoid includes a solenoid body, and a plunger adapted to be driven forwardly and backwardly with respect to the solenoid body. The plunger is adapted to be movable in a range between a retracted position where it is retracted outside the movement path of the engagement arm, and an engagement position where it is stretched across the movement path of the engagement arm. The solenoid is operable, when the selector lever is manually moved into a parking range zone, to move the plunger forwardly from the retracted position to the engagement position to allow a peripheral wall of the plunger to stop the engagement arm located in the lock position from being moved to the unlock position, and, in response to a braking operation of the brake device, to move the plunger backwardly from the engagement position to the retracted position to allow the stopping of the movement of the engagement arm to be released.

In the above shift-lock mechanism, when the selector lever is set to the parking range zone, the plunger is moved forwardly from the retracted position where it is retracted outside the movement path of the engagement arm to the engagement position where it is stretched across the movement path, to stop a movement (from the lock position to the unlock position) of the engagement arm located in the lock position.

Thus, different from a conventional shift lock mechanism designed to drive a lock member coupled to a plunger to lock or unlock a transmission range-switching member, the plunger can be simply moved without the need for driving the plunger together with the lock member.

Further, when the plunger is moved from the refracted position to the engagement position where it is stretched across the movement path of the engagement arm, the movement of the engagement arm is stopped by the peripheral wall of the plunger, so that the plunger receives a force from the engagement arm in a direction different from the forward-backward movement direction of the plunger (in a direction intersecting with the center axis of the plunger at a given angle). This makes it possible to reduce a force to be applied from the engagement arm in a direction causing the movement of the plunger to be blocked, and reliably move the plunger forwardly and backwardly to stop the movement of the engagement arm, without largely increasing a driving force for the plunger. Thus, the solenoid can be reduced in size to facilitate a reduction in overall size of the shifter.

(2) Preferably, in the above shift-lock mechanism, the lock member includes a lock shaft capable of being inserted into and pulled out of a lock hole provided in the transmission range-switching member, and a lock shaft-actuating member coupled to the lock shaft, wherein the lock shaft-actuating member is adapted, when the selector lever is manually moved into the parking range zone, to be pressed and moved by the selector lever, so as to allow the lock shaft to be inserted into the lock hole.

In this shift-lock mechanism, when the selector lever is moved into the parking range zone, the lock shaft-actuating member of the lock member is automatically pressed and moved by the selector lever, and the lock shaft coupled to the lock shaft-actuating member is also automatically inserted into the lock hole. This makes it possible to more reliably lock the transmission range-switching member to enhance reliability of the shift lock.

(3) Preferably, the above shift-lock mechanism further comprises a biasing member adapted to bias the lock shaft, wherein the lock shaft-actuating member is operable, when the selector lever is manually moved into the parking range zone, to insert the lock shaft into the lock hole against a biasing force of the biasing member, and the biasing member is operable to bias the lock shaft inserted in the lock hole, in a direction causing the lock shaft to be pulled out of the lock hole.

In this shift-lock mechanism, when an engagement between the plunger and the engagement arm is released, the lock shaft inserted in the lock hole can be pulled out of the lock hole by the biasing force of the biasing member. This makes it possible to establish an unlocked state in a easy and reliable manner.

What is claimed is:

1. A shift-lock mechanism comprised in a shifter that is provided with a selector lever and a transmission range-switching member coupled to the selector lever, to switch between a plurality of shift ranges of an automatic transmission based on respective movements of the selector lever and the transmission range-switching member, the shift-lock mechanism comprising:
- a lock member that locks or unlocks the transmission range-switching member;
- a solenoid controllably operated in response to an operation of a brake device provided on a vehicle;
- an engagement arm releasably engaged with the solenoid, and
- a main control unit that controls the solenoid, wherein:
- the engagement arm is operatively connected to the lock member in such a manner as to be movable along a given movement path and over a range between a lock position corresponding a locked state in which the transmission range-switching member is locked by the lock member, and an unlock position corresponding an unlocked state in which the lock by the lock member is released;
- the solenoid includes a solenoid body, and a plunger that is driven forwardly and backwardly with respect to the solenoid body in such a manner as to be movable over a range between a retracted position where the plunger is retracted outside the movement path of the engagement arm, and an engagement position where the plunger is stretched across the movement path of the engagement arm,
- the plunger consists of a rod-shaped member having a central axis oriented in a direction perpendicular to a moving direction of the engagement arm;
- the main control unit controls movement of the plunger forwardly from the retracted position to the engagement position when the selector lever is moved manually into a parking range zone, and controls movement of the plunger backward from the engagement position to the retracted position when a braking operation of the brake device is performed;
- the plunger has a peripheral wall to stop the engagement arm that is located in the lock position from being moved to the unlock position when the plunger is in the engagement position, and, the plunger that is located in the retracted position allows the movement of the engagement arm;
- the lock member includes a lock shaft configured to be inserted into and pulled out of a lock hole in the transmission range-switching member, and a lock shaft-actuating member coupled to the lock shaft;
- the selector lever has a lever shaft pressing the lock shaft-actuating member when the selector lever is moved manually into the parking range zone; and
- the lock shaft-actuating member pressed by the lever shaft allows the lock shaft to be inserted into the lock hole.

2. The shift-lock mechanism as defined in claim 1, further comprising a biasing member
- that allows the lock shaft to be inserted into the lock hole when the selector lever is moved manually into the parking range zone and that biases the lock shaft inserted in the lock hole in a direction causing the lock shaft to be pulled out of the lock hole.

* * * * *